United States Patent [19]

Takekuma et al.

[11] Patent Number: 5,564,033

[45] Date of Patent: Oct. 8, 1996

[54] DISK ARRAY SYSTEM USING DETACHABLE MEMORY MEDIUM

[75] Inventors: Toshitsugu Takekuma, Ebina; Shozo Satake, Hadano; Asayoshi Kawashita, Chigasaki, all of Japan

[73] Assignee: Hitachi, Ltd., Tokyo, Japan

[21] Appl. No.: 267,385

[22] Filed: Jun. 29, 1994

[30] Foreign Application Priority Data

Jun. 29, 1993 [JP] Japan ................................ 5-158809

[51] Int. Cl.$^6$ .................................................. G06F 12/00
[52] U.S. Cl. ................... 395/442; 395/497.01; 395/833; 364/242.3; 364/245; 364/246.3; 364/254; 364/DIG. 1
[58] Field of Search .................... 395/825, 829, 395/830, 833, 837, 404, 405, 442, 444, 497.01, 182.03, 182.04, 182.05, 474, 479, 481; 365/189.04, 230.01

[56] References Cited

U.S. PATENT DOCUMENTS

| | | | |
|---|---|---|---|
| 4,727,475 | 2/1988 | Kiremidjian | 364/200 |
| 4,870,643 | 9/1989 | Bultman et al. | 395/182.05 |
| 4,882,671 | 11/1989 | Graham et al. | 395/309 |
| 5,287,478 | 2/1994 | Johnston et al. | 395/438 |
| 5,303,214 | 4/1994 | Kulakowski et al. | 369/34 |
| 5,325,497 | 6/1994 | Jaffe et al. | 395/425 |
| 5,373,401 | 12/1994 | Bentley et al. | 360/50 |
| 5,394,534 | 2/1995 | Kulakowski et al. | 395/439 |
| 5,442,752 | 8/1995 | Styczinski | 395/404 |

FOREIGN PATENT DOCUMENTS 4-279924  6/1992  Japan .

OTHER PUBLICATIONS

Nikkei Computer 1992, Nikkei BP, pp. 87–99, Mar. 9, 1992.

*Primary Examiner*—Alyssa H. Bowler
*Assistant Examiner*—Dhiren R. Odedra
*Attorney, Agent, or Firm*—Fay, Sharpe, Beall, Fagan, Minnich & McKee

[57] ABSTRACT

An external memory unit for a data processing system has a plurality of detachable memory media. Data is written in parallel to the memory media. Since the positions of the memory media can be switched, reference information is written in each of the media during an initialization process. Once initialized, the data can be read from and written to the memory media regardless of their current and former positions in the external memory unit. The reference information has sequence information indicating the position of a memory medium in a sequence when data is first written to a group of media as part of an operation that subdivides data and writes the subunits to the group. The name of the group is also included in the reference information. When a subsequent read or write operation is requested, the group information is used to determine if all of the media required for executing the request are present in the external memory unit, and if so, the operation is executed.

18 Claims, 27 Drawing Sheets

DISK ARRAY SYSTEM USING DETACHABLE MEMORY MEDIUM

FIELD OF THE INVENTION

The invention relates to data transfer between a peripheral memory device having detachable external memory media and a data processing device and a data processing system using same.

BACKGROUND OF THE INVENTION

Data processing systems require high speed processing for a large amount of data. Internally, within a data processor, increasing the speed of an LSI has been accomplished, for example through pipeline data processing. However, it has been difficult to increase the speed at which data is read from and written to a peripheral device, particularly an external memory unit. To increase the read/write speed for an external memory unit, the memory size and density has been increased, but the rate of increase has not been as great as that for internal data processing. Therefore, when a large amount of data is to be transferred and processed, the increased internal operating speed of the data processing system is not fully realized since the processing speed is limited by the read/write transfer speed with respect to the external memory unit. Accordingly, high speed transfer with an external memory unit is becoming an increasingly important objective to achieve.

In general, there are two types of external memory units, the fixed type, such as a unit having an internal hard disk in which the memory medium is fixed to the device and the detachable type, which includes floppy disks, DAT, CDs, memory cards and the like.

In a conventional data processing system, a serial data transfer system is employed for transferring the data bit by bit between the data processing device and the external memory unit. Accordingly, the transfer time is relatively long. To overcome this limitation, a disk array has been proposed for a fixed type external memory unit, in which high speed data transfer becomes possible by read and write of data in parallel to a plurality of memory media. Such a disk array of the fixed type external memory unit is disclosed in for example, "Nikkei Computer March 9," pp. 87 to 99, Nikkei BP, 1992. Further, related techniques are disclosed in Patent Application Laid-Open No. H4-279924 specification.

SUMMARY OF THE INVENTION

In a conventional disk array system, having a fixed type external memory unit, high speed transfer is achieved without increasing access speed by performing high speed read and write with respect to the fixed memory devices, simultaneously. However, conventional disk array systems do not use detachable memory media and the increase of data transfer with respect to such detachable memory media has only been achieved by increasing the density of the memory media.

An object of the present invention is to provide a disk array system for an external or peripheral memory unit using detachable memory media, i.e. one of several types of memory media used in detachable memory devices having means for housing or receiving the medium for performing read and write processing, wherein the medium is not fixed to the device. However, to implement a disk array system for external memory unit(s) using detachable memory media, several problems need to be addressed.

First, in a fixed type external memory unit, each memory medium's position within the unit is fixed so that a predetermined position of each of the memory media for write is the same as that for read. On the other hand, when an external memory unit uses detachable memory media, it is possible to change the positions of the memory media as the memory media is selectively detached and replaced. Accordingly, the following points must be addressed and resolved.

(1) It must be checked for a data read operation of data that has been stored as a series of divided data, whether or not all of the memory media of a group specific to the data series being read is present in the same combination as when the corresponding write operation of the data series occurred; and (2) A method of reading the series of data must be executed when all of the memory media of the group is present, but when the positions of the memory media are different from that occurring during the corresponding write operation.

In order to address the above issues, the detachable memory media of an external memory unit according to the present invention stores reference information including group information indicating that the detachable memory media belongs to a specific group of memory media that is required to be in place in the external unit for performing read/write of a series of data recorded on the group of media; and sequence information related to the read/write sequence in which the series of data has been written on the group of memory media. The reference information is preferably stored in the detachable media. The external memory unit reads the reference data, including the group information and sequence information to determine whether or not the grouping of the memory media for a specific data read or write operation is correct. If not, appropriate selection and replacement of the detachable memory media in the external memory unit is instructed to be performed.

In the external memory unit of the present invention, a series of data can be divided and written to the individual detachable memory media regardless of the (mounting) positions of the respective memory media within the unit. Specifically, data can be divided into a series and written to the plurality of memory media independently on the basis of the sequence information. Then, during reading of the series of data, means are provided for restoring the data regardless of the (mounting) individual positions of the group of media on the basis of the sequence information.

When a data write operation is to be executed to an external memory unit having a plurality of detachable memory media, reference information is stored in the memory media. The reference information includes group information (at least) indicating that the plurality of the memory media are part of a group of memory media in which data is to be divided into a series and written, and sequence information related to a write sequence or a read sequence of the group of memory media after media that is required for restoring the series.

Data can be stored in and read out from a plurality of detachable memory media according to the present invention by receiving data, dividing the data into a series of data, writing the series of divided data in the plurality of memory media individually on the basis of the reference information; reading the divided series of data from the plurality of memory media on the basis of the reference information, and then restoring and outputting the restored or reconstructed data.

According to the present invention, it is also possible to simultaneously write to and simultaneously read from the plurality of memory media. Thus it becomes possible to write and read at high speed. A large amount of data, as well as a small amount of data can be written according to the present invention to the plurality of detachable memory media for an external memory unit.

If a large amount of data is divided in byte units and the divided data is written in parallel to the plurality of detachable memory media, a high speed read and write operation becomes possible. The divided data is written to and read out from the memory media in parallel and then restored for the read operation to output the original data as it existed before the division.

It is possible to simultaneously write to or read from a plurality of memory media. When a plurality of write instructions are supplied simultaneously in, for example, a multi tasking operation, the operations are performed on the basis of the priority of the write processing, in the conventional technique. According to the present invention, it is possible to reduce the time required to write all data in a similar situation since, for example, the same number of data as the number of memory media can be written simultaneously in the present invention.

BRIEF DESCRIPTION OF THE DRAWINGS

Further objects, features and advantages of the present invention will become more clear from the following detailed description of the preferred embodiments, shown in the accompanying drawings, wherein.

DETAILED DESCRIPTION OF THE PREFERRED EMBODIMENTS

Figure 24:
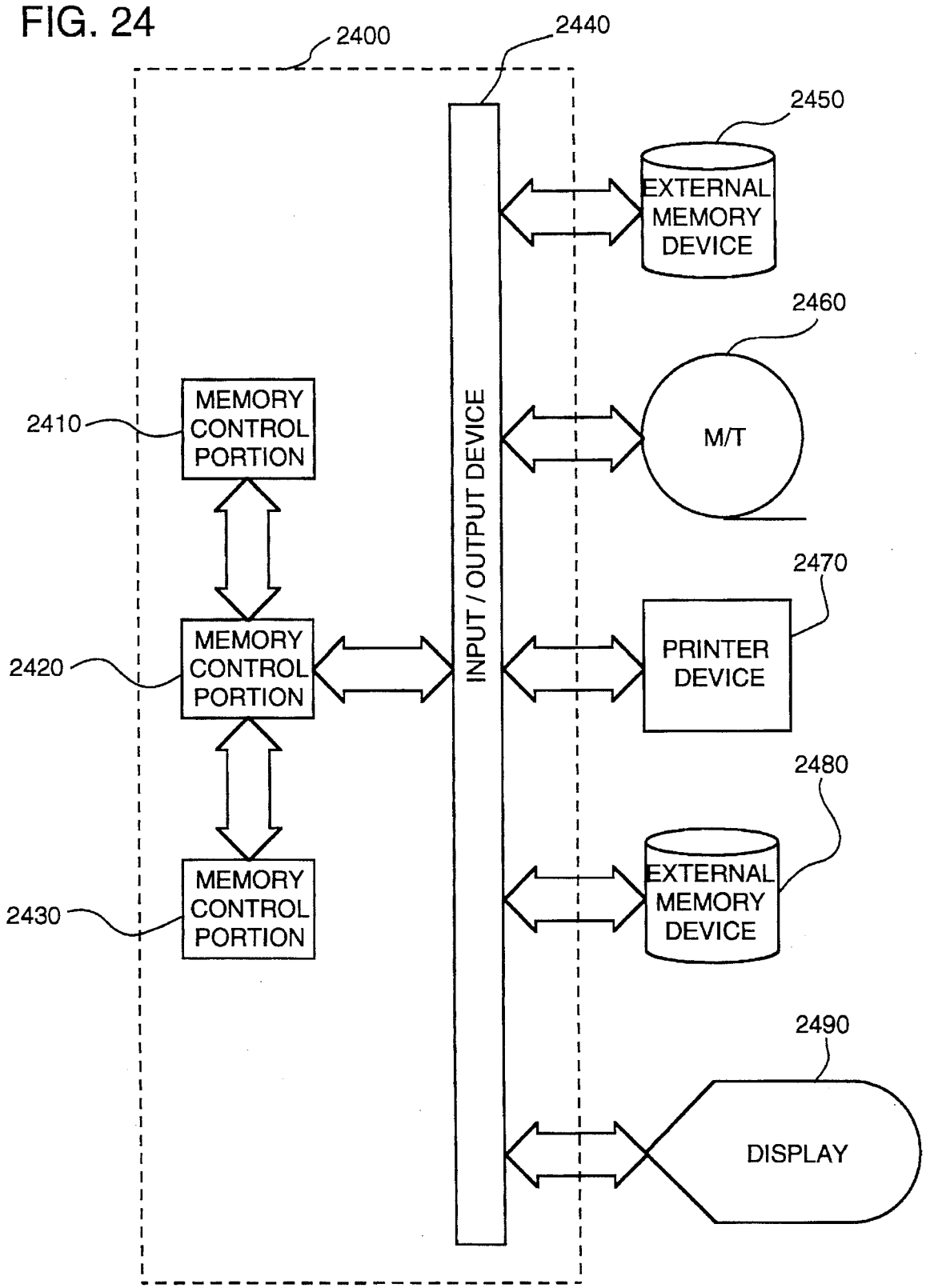
FIG. 24 is a system construction showing an example of a data processing system according to an embodiment of the present invention.

FIG. 24 shows one embodiment to which the data processing system of the present invention is applicable. A data processing device 2400 has peripheral devices 2450 to 2490. These devices include an external memory unit 2450 of the fixed type, a magnetic tape unit 2460, a printer device 2470, an external memory unit 2480 having a plurality of detachable memory media and a display 2490.

The data processing device 2400 includes an operation portion 2410 and a memory device 2430 for storing programs and data, etc., necessary to operate the operation portion 2410. The operation portion 2410 is, for example, a central processing unit or other micro processor. Control of I/O with the peripheral devices is provided by an input/output device 2440. Management of memory in main memory device 2430 is controlled through a memory control portion 2420.

In operation, processor 2410 reads in data and programs, etc. stored in the main memory device 2430 through the memory control portion 2420 and performs operations accordingly. Further, the operation portion 2410 reads data stored in the peripheral devices 2450, 2460 and 2480 through the input/output device 2440 and processes the data.

The processed data is stored in the main memory device 2430 through the memory control device 2420 by operation of processor 2410. Alternatively, the data is stored in one of the peripheral devices or units 2450, 2460 and 2480 through the memory control portion 2420 and the input/output device 2440. Further, the processed data can be output to the printer device 2470 or the display device 2490.

The present invention is directed to I/O with the external memory unit 2480, which has detachable memory media.

Use of the term "detachable memory medium" refers to any type of recording medium that is readily exchangeable with the external memory unit 2480, for example floppy disks, optical disks, and including digital audio tape, magnetic tape cartridges, memory cards and similar memory media. Preferably, the external memory unit has a plurality of read/write devices for receiving the detachable media, such as a floppy disk drive, for example. Alternatively, the external memory unit can accommodate receiving memory media devices that have self contained drive means and read/write means, such as detachable hard disks, or semiconductor memory media, such as PC (PCMCIA) cards.

Figure 1:
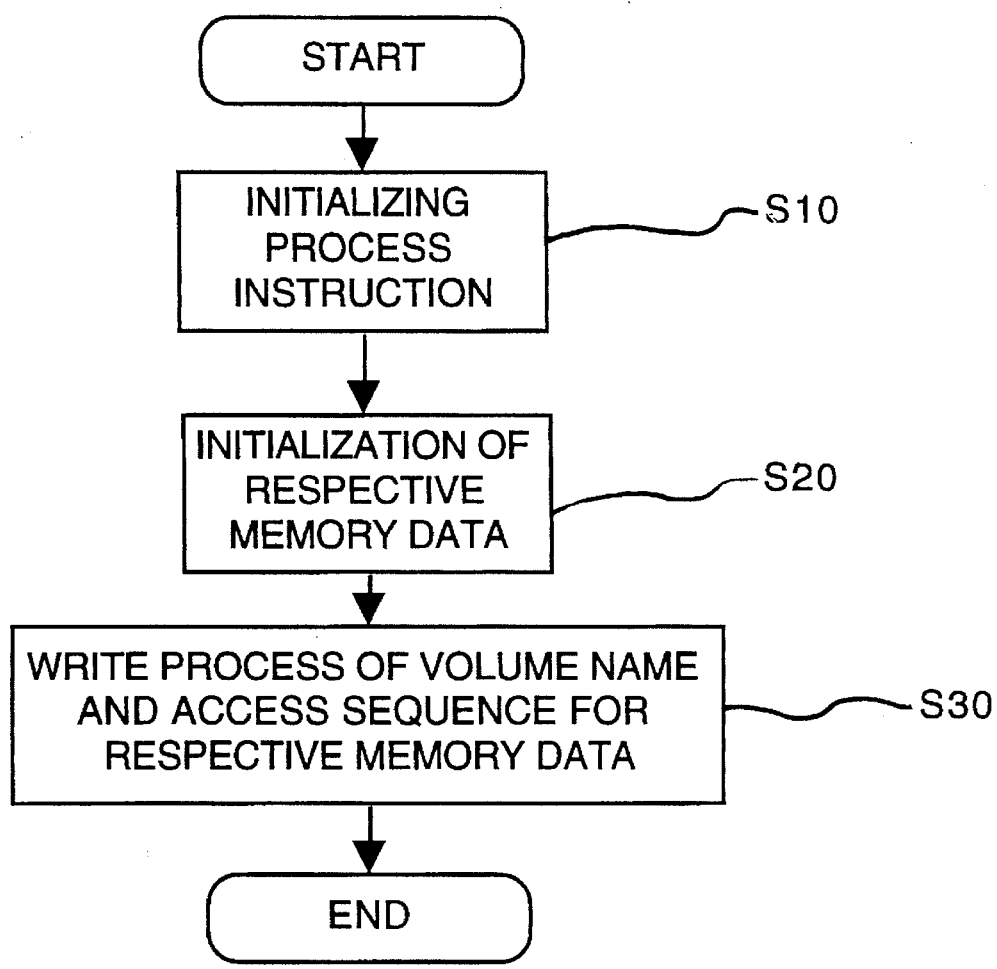
FIG. 1 is a flowchart of a processing for initializing the memory media.
Figure 2:
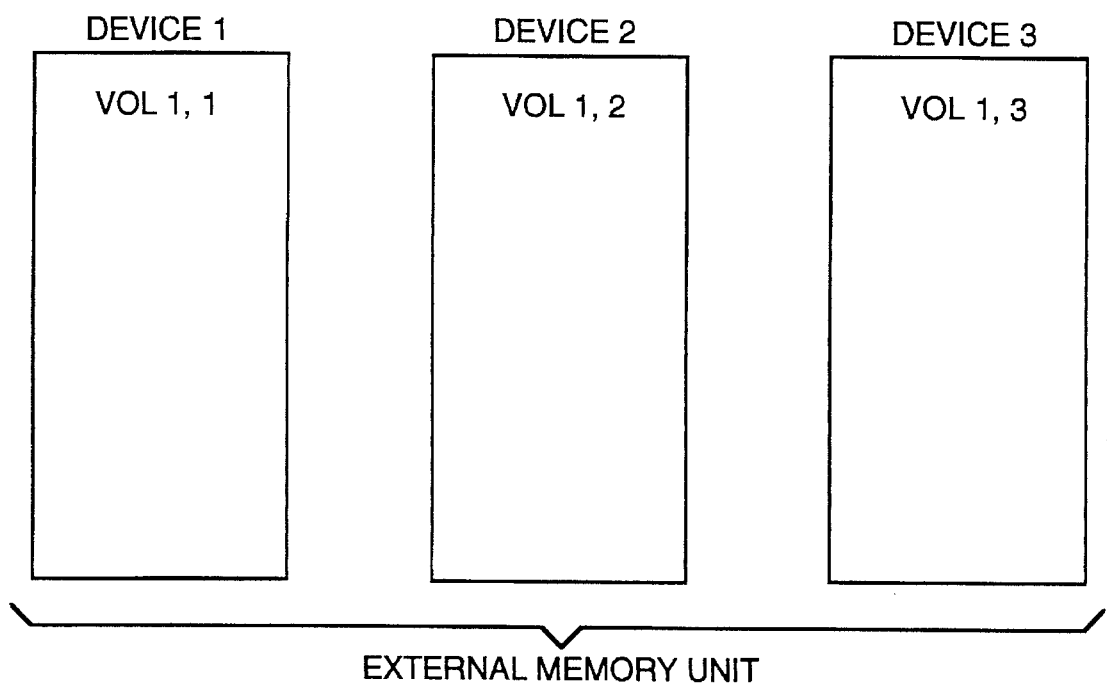
FIG. 2 is a drawing for explaining the record content of a memory medium after initialization.
Figure 23:
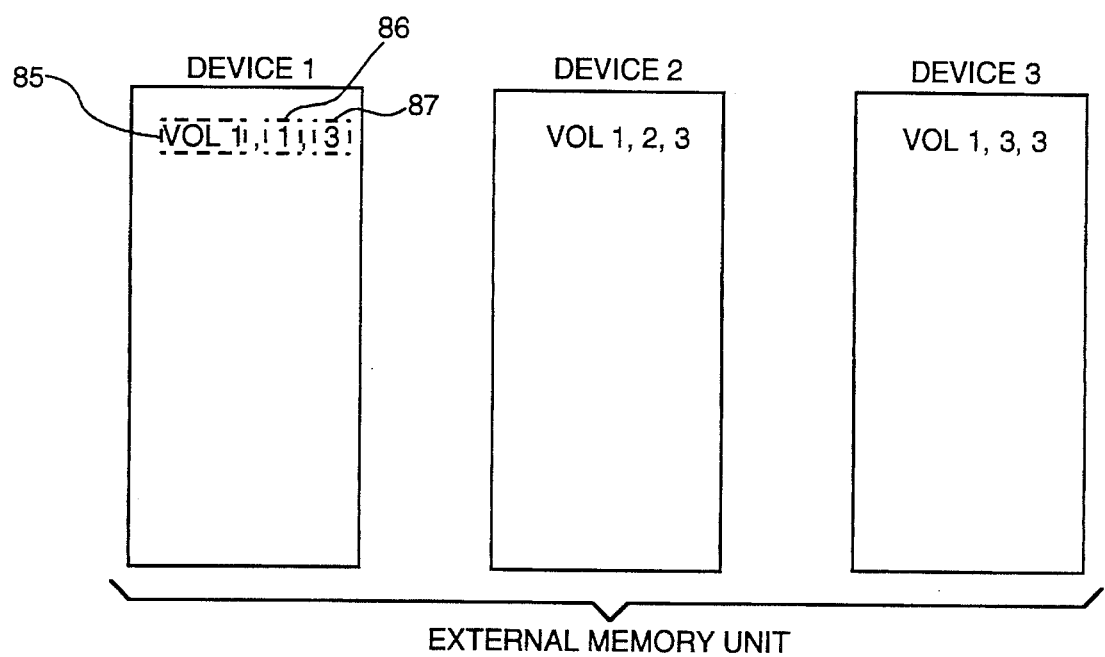
FIG. 23 is a drawing for explaining the record content of memory media after initialization.

FIG. 1 shows a flow chart for initializing the memory media, which is performed by the external memory unit. FIGS. 2 and 23 are diagrams for explaining the record content of a memory medium after it has been initialized (corresponding to first and second examples of the record content). FIGS. 3, 4, 5 and 6 are flow charts explaining the procedures of checking for the correct combination of memory media and determining an access sequence, which are performed by the external memory unit when the media are set in the device (according to first to fourth examples of the processing procedures of the present invention). FIG. 7 is a flow chart showing the processing for determining a correct sequence within the external memory unit when positions of the memory media that existed for a write operation are different from those that exist when a read operation is requested.

In a conventional disk array system of the fixed type, it is possible to simultaneously write and read data at high speed by dividing the data among the plurality of memory media. The high speed read and write operations are achieved without changing the access speed to the respective memory medium. However, when a disk array system is used in an external memory unit having detachable memory media, the following problems occur.

With fixed type external memory units, the positions of the memory media do not change and the data to be written to the memory media is divided according to an access sequence and written in parallel to the memory media, thereby achieving high speed write. In the read operation, the divided data is read in parallel and reconstructed according to the access sequence. On the other hand, for an external memory unit having detachable memory media, the memory media can be changed in position or removed from the memory disk device and replaced. Accordingly, the following problems may occur.

(1) The user may erroneously set a memory medium other than the one to be read from in the unit in a read mode.

(2) The user may, for a read mode, set a memory medium in a different device position from that in which the write operation was executed previously.

Because of these possibilities, it is clear that the read and write of data according to a predetermined access sequence established for use with a fixed external memory unit is not applicable to that of a memory device having detachable memory media. Therefore, the invention addresses the above-identified possibilities and takes measures to prevent these possibilities from occurring. Such measures will be described in the embodiments set forth according to the following.

First, a processing for initializing memory media, a processing for checking the memory media combination which is performed in the external memory unit when the memory media are set therein, and a processing for determining the access sequence will be described with reference to FIGS. 1 through 7 and 23.

As shown in FIG. 1, the initialization processing for the memory media includes the step of receiving an initializing instruction from a user (step S10) that is input through a keyboard, for example, the step of performing a format processing (initialization processing) for all of the memory media to be written with data (step S20) and the step of performing a write processing of the volume name and access sequence information (step S30). This information can be determined internally by the external memory unit with a CPU, for example, or by the host data processor.

FIG. 2 shows an example of devices 1–3 after they have been initialized. The volume or group name is "VOL1" and the access sequence is such that the device 1 is first, the device 2 is second and the device 3 is third. Each device has read/write means and receives one detachable medium and may be a separate device, but is preferably part of an external memory unit, which is a peripheral device with respect to the data processing system.

Figure 3:
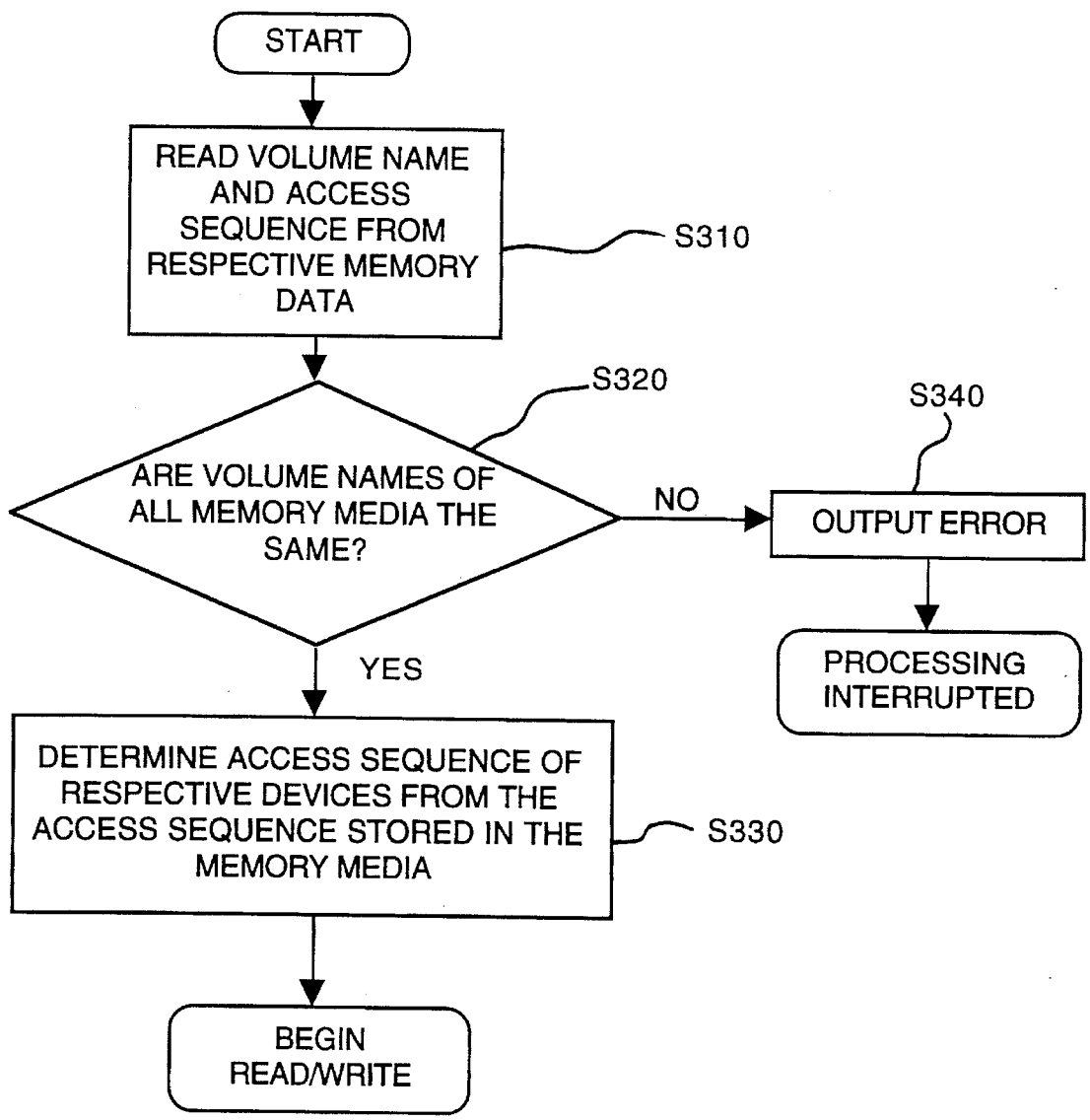
FIGS. 3–6 are flow charts for explaining the procedure of checking the memory media combination and for determining an access sequence, which are performed in the external memory unit when the memory media are set therein according to four different examples, respectively.

By using the memory media subjected to this initialization processing and, during access time to the memory media (write time, read time), by referencing volume names of all of the memory media set in the plurality of devices of the external memory unit (step S310) and checking whether or not the volume names are identical (step S320) as shown in FIG. 3, it is possible to judge that the plurality of the thus set memory media is a combination of accessible memory media only when the volume names are identical (in this case, all of the devices are used in order to realize high speed operation). The checking can be done under control of the host CPU, or preferably by a CPU of the external memory unit in response to a read/write command.

That is, if any of the set memory media has a different volume name, a suitable message is displayed on either display 2490 of the data processing device or on a display, not shown, of the external memory unit indicating the impossibility of the access to the memory media for the desired write operation. In other words, the user is notified of an incorrect combination of the set memory media (step S340).

In the step S320, when it is judged that the memory media is accessible, the access sequence information stored in the memory media as individual partial sequence data, such as the number of a position in a numerically ordered sequence, is referenced and the access sequence of the respective devices is determined by the referenced access sequence (step S330).

By writing the access sequence in the respective memory media, it is possible to restore the data to its state before division by reading the written data according to this sequence.

That is, as shown in FIG. 7, since the read access sequence is determined on the basis of the write access sequence even if the memory media that are set, during data read, are in different device positions from those during data write, the data subunits can be read out in the order they were written according to the access sequence for restoration. Specifically, first the subunit of device 3 is read out, then device 1, followed by devices 2, 4 and 5 to derive the correct sequence of data subunits in the read operation. The subunits are then restored to the original units in a conventional manner. Second and subsequent writes are made according to this sequence. By writing data in this manner, it is possible to read out all data in a common sequence when the written data is to be read out. The processing for write and read will be described later.

Further, it is possible, in the initialization processing of the memory media, to write only the volume name and, in the data write processing, to write an access sequence for only the data. In this case, in a read of the data thus written or in a second and subsequent write, the access is performed according to the access sequence for only the data.

Figure 4:
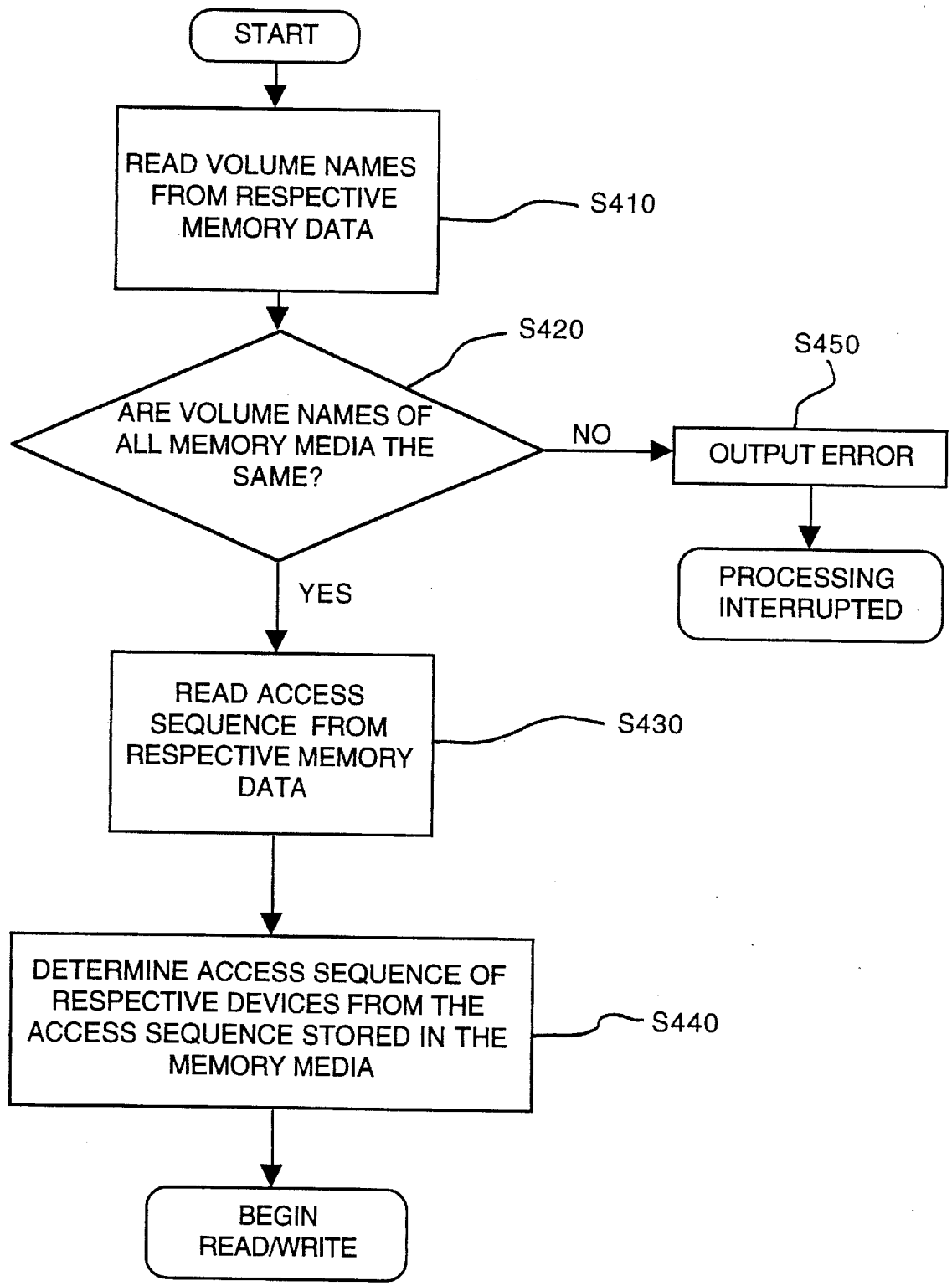

The processing for checking the memory media combination and for determining the access sequence can be performed by the processing shown in FIG. 4 instead of the processing shown in FIG. 3. Although, in FIG. 3, the volume name and access sequence are read out in the first step (step S310), only the volume name is read out in a first step (step 410) and the access sequence is read out in a subsequent step (step S430) in FIG. 4.

Further, although, in the above mentioned embodiment, a case is described in which the access is possible when the volume names of all of the memory media set in the external memory unit are identical, it is possible, in order to access the data in a case where the volume names of the set memory media are completely different from each other, to check a combination of the memory media by using the following method.

Figure 27:
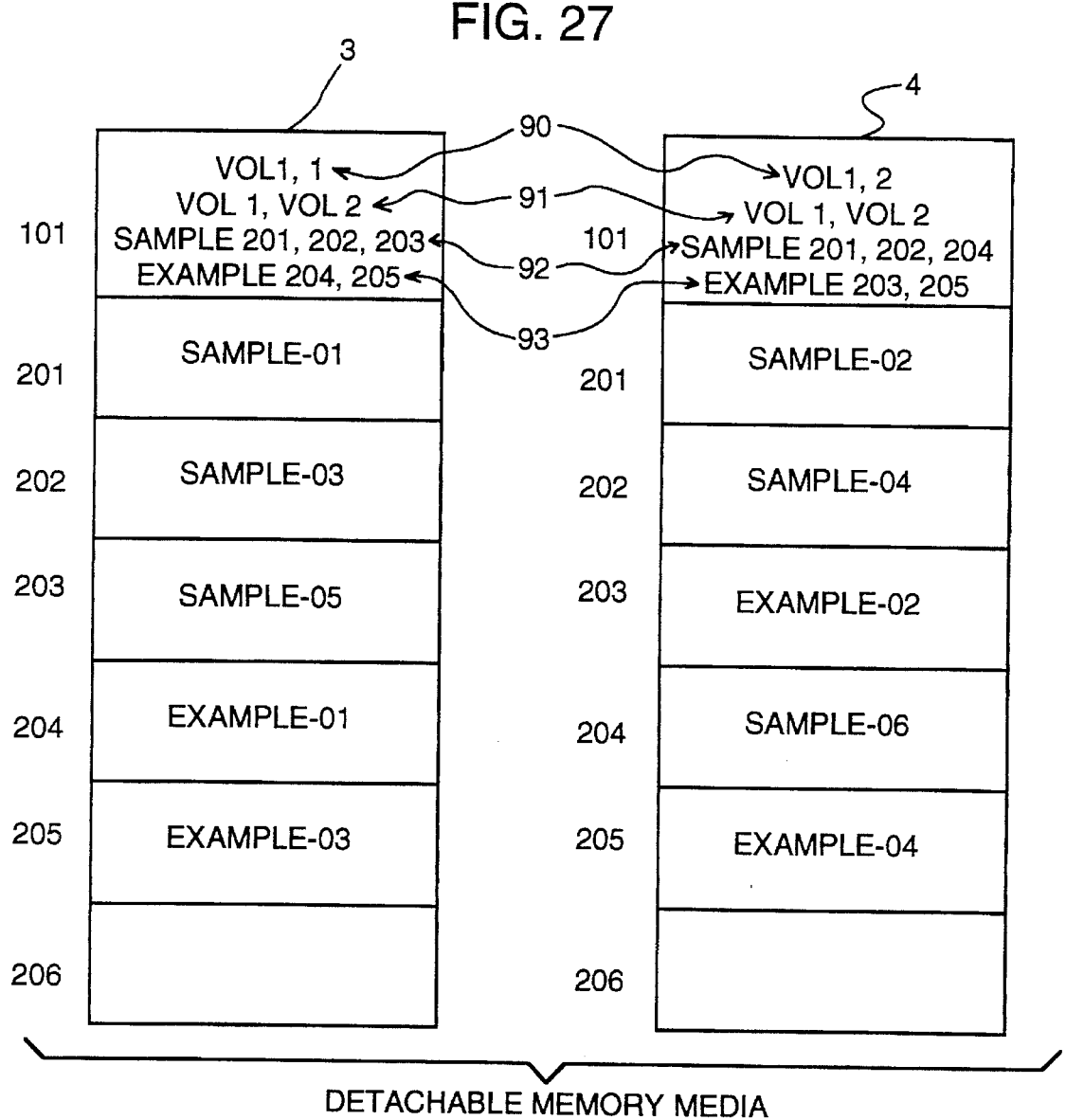
FIG. 27 is a drawing for explaining memory information stored in the external memory unit according to an embodiment of the invention.

That is, in the initialization processing step, volume (group) names assigned to the respective memory media together with volume names of all other memory media set during the initializing time are written in all of the memory media. For example, when three memory media are initialized with respective volume names A, B and C, each of the memory media is written with its volume name together with volume names of the other two memory media. Examples of two memory media having reference information of this type written to them is shown in FIG. 27. The information includes a first line 90 of group information and sequence no., a second line 91 identifying all of the names of the memory media group, and third and fourth lines 93, 94 of respective top addresses of the data named "SAMPLE" and "EXAMPLE". When such information is provided for each memory medium in a group, then when only one memory medium of the group is set in the external memory unit, the information can be read and used to display to the user the volume name(s) of the missing members of the group.

Figure 5:
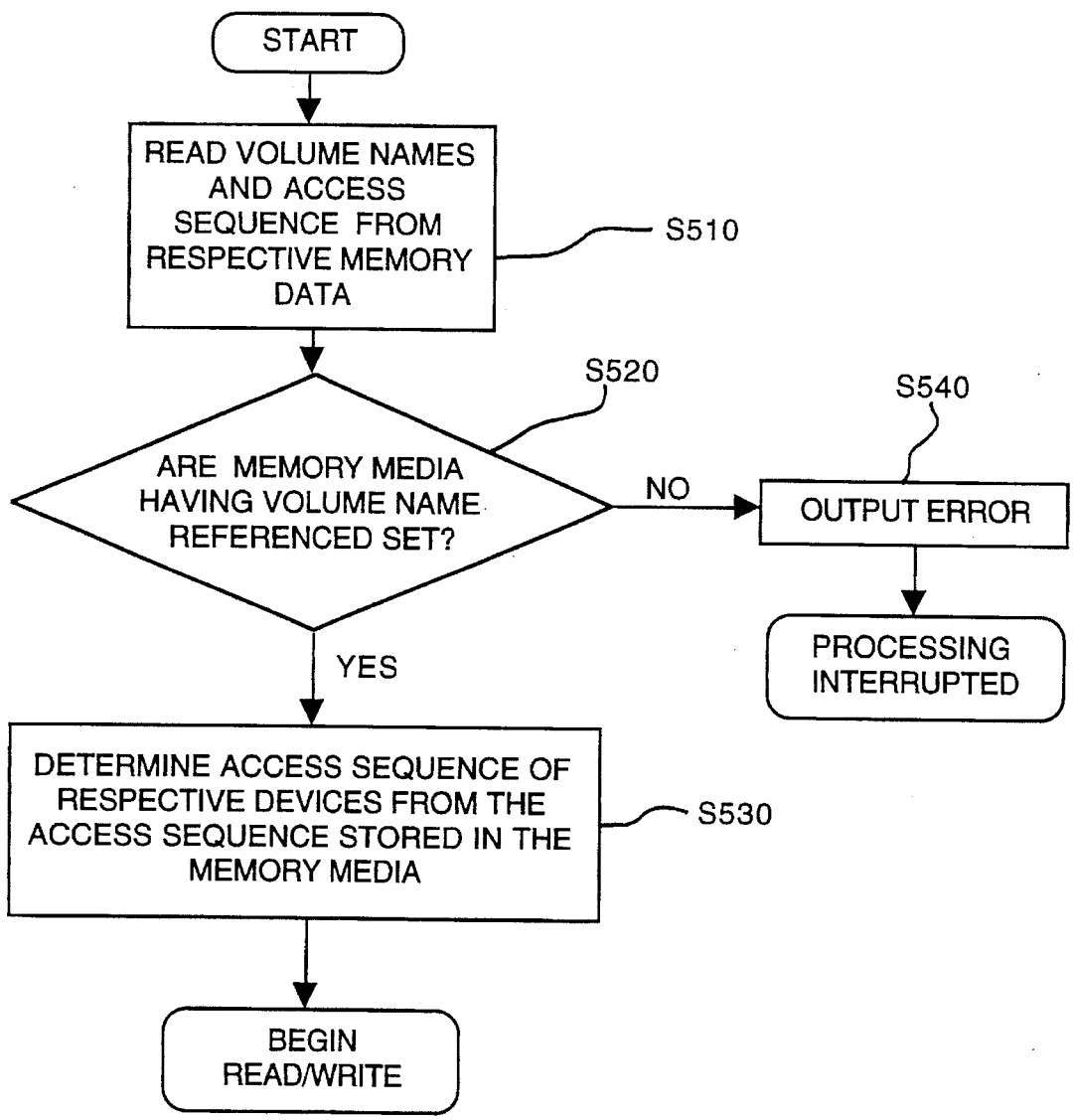

FIG. 5 shows a flowchart of a processing for checking a combination or group of memory media and for determining an access sequence when the volume names of the all memory media set in the external memory unit are written.

When memory media have been set in the memory unit and initialized, a volume name of the memory medium set in a device whose device number is, for example, the smallest (which is written in the memory medium) and the volume names of all of the other memory media of the group are referenced (step S510). Then, the referenced volume names are compared with the volume names of the memory media set in the other devices (step S520). If there is no volume name among the referenced volume names found in the volume names of the memory media set in the devices, the combination of memory media is one which is inaccessible and a step such as outputting an error message is performed (step S540). When it is decided in the step S520 that all of the memory media having the volume name referenced in the step S510 are set, the processing is shifted to a step S530 and the access sequence of the respective devices is determined on the basis of the access sequence read out in the step S510. In the external memory unit using detachable memory media, since a memory medium set in a device having the smallest device number is uncertain, all memory media must be written with volume names of all of the devices.

Although, in the above described example, all of the memory media are set in all of the devices, the present invention is also applicable to a case where the number of memory media to be set in the memory unit is smaller than the number of devices for the unit, according to the following scheme.

First, as shown in FIG. 23, in addition to "volume name" 85 and "access sequence number" 86, "number of memory media set in the initializing time" 87 (total number of memory media in the group) is written in the respective memory media in the initializing time. Then, when the memory media are set after initialization, "volume name", "access sequence" and "number of memory media set in the initializing time" of a memory medium set in the device having the smallest number are referenced to check whether or not the number of the memory media set in the external memory unit is coincident with a "number of memory media set in the initializing time". If these numbers are not coincident, an error is displayed to notify the user and a waiting state is held until a coincidence is obtained.

If the number of the memory media coincides with the volume names of the respective set memory media that are read, it is checked whether they are coincident with the volume name read out first. If a volume name of any of the memory media is different, an error is displayed to notify the user and the check is repeated from the initial checking of the number of memory media until a correct memory medium is set. After all of these checks are completed, the access sequence of the memory media is determined.

Although, in the above description, the volume names of the respective memory media are the same, this invention is applicable to a case where volume names of all of the memory media are different. In such case, after the check process for the number of memory media, a combination of memory media is checked according to the same procedures as those in the case where the all devices are set with memory media.

Transfer speed is substantially proportional to the number of memory media set. Therefore, when the number of memory media is variable, transfer speed between the data processing device and the external memory unit must be made variable and, when a program for access with respect to the external memory unit is executed, transfer speed must be determined preliminarily. Therefore, when a program execution instruction is issued, the data processing device outputs a memory number notice instruction to the memory media requesting notice of the number of memory media, receives the number of memory media in the external memory unit from the memory medium requested and determines the appropriate transfer speed corresponding to the number of the memory media. When the number of memory media is constant and not variable, there is no need of the processing for determining the transfer speed.

Figure 6:
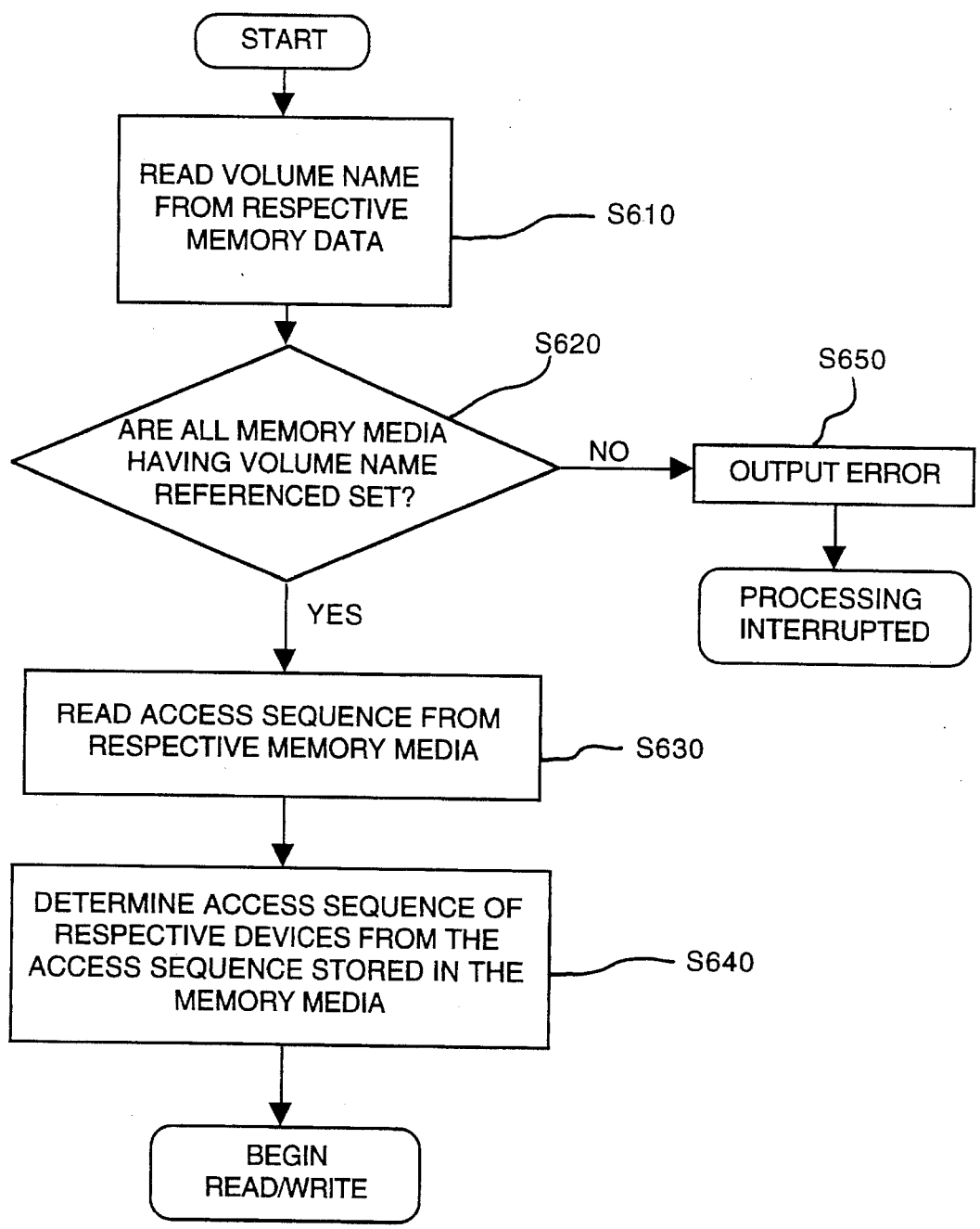
Figure 7:
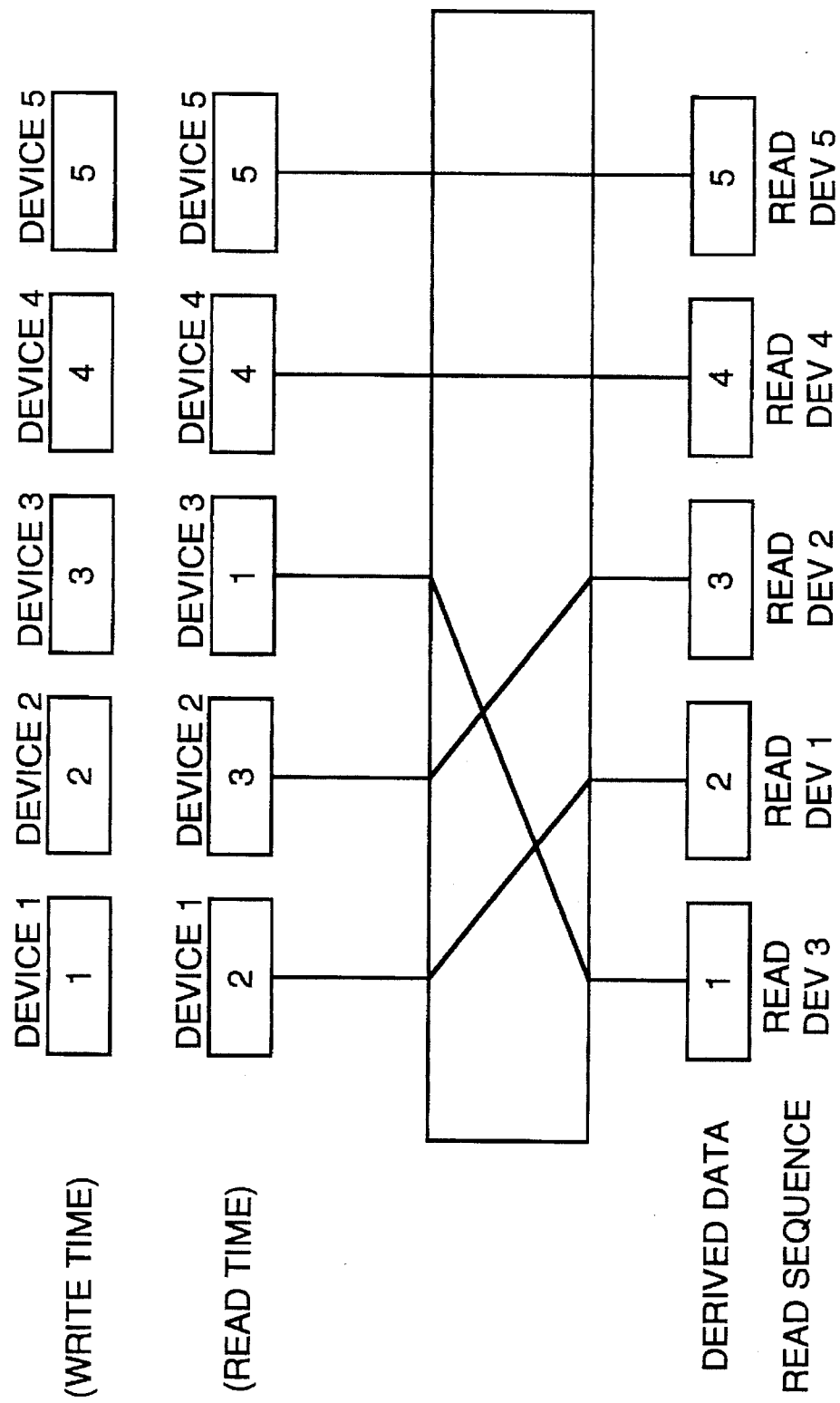
FIG. 7 is a diagram for explaining the determination of a correct sequence within the external memory unit when positions of the memory media in write are different from those in read.

The processings for checking the combination of memory media and for determining the access sequence may be performed by the processing shown in FIG. 6 instead of that shown in FIG. 5. Although, in FIG. 5, the volume name and the access sequence are read out in the first step (step S510), the processing in FIG. 6 differs in that only the volume name is read out in a first step (step S610) and the access sequence is read out in a subsequent step (step S630).

In the following description, a case is disclosed where volume names of all of the memory media set in the external memory unit are the same. However, there could be different volume names written, by using the above mentioned method. That is, the present invention is not limited to the case where all volume names of the memory media are the same.

Figure 8:
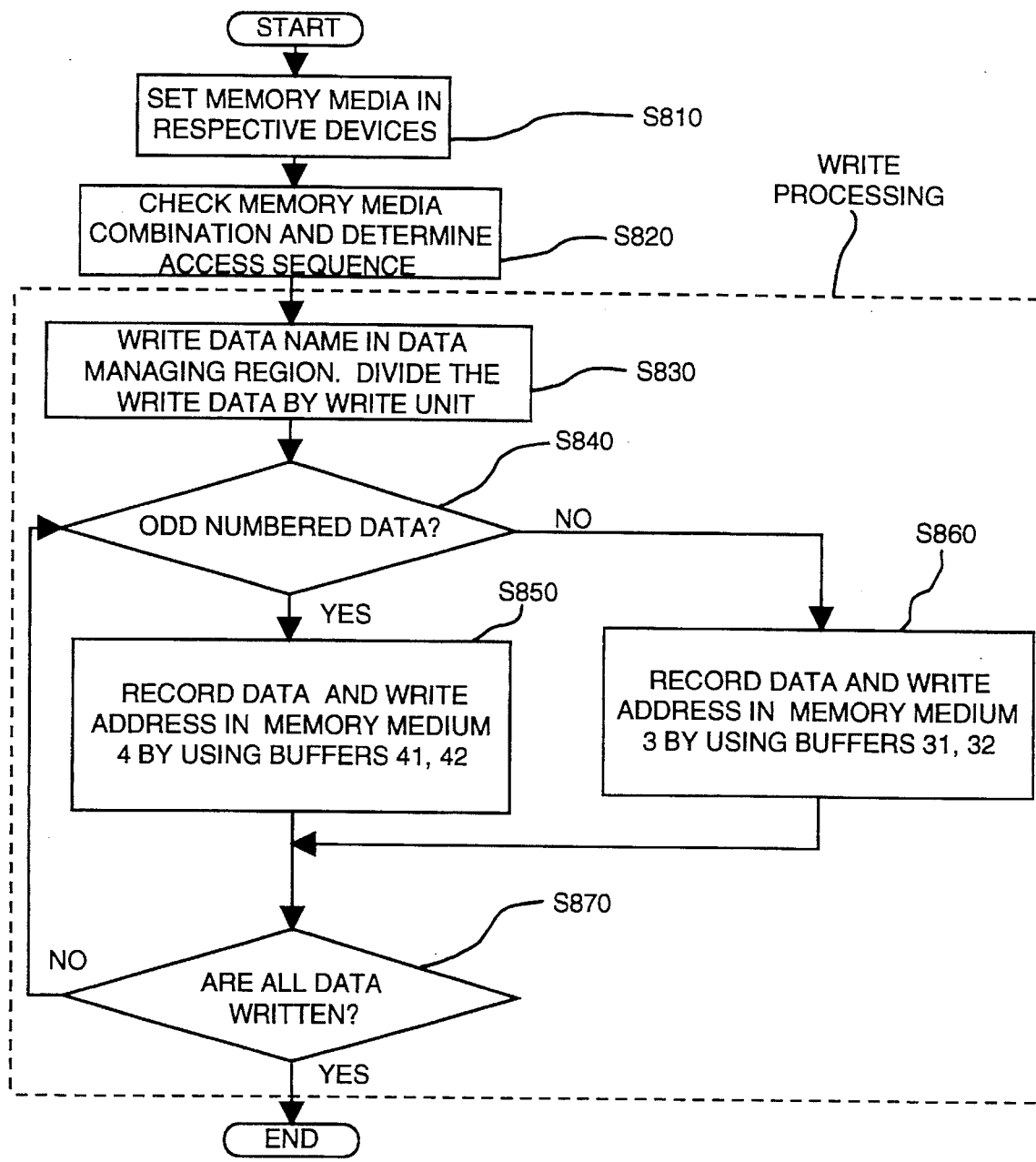
FIG. 8 is a flowchart of a high speed write processing.
Figure 9:
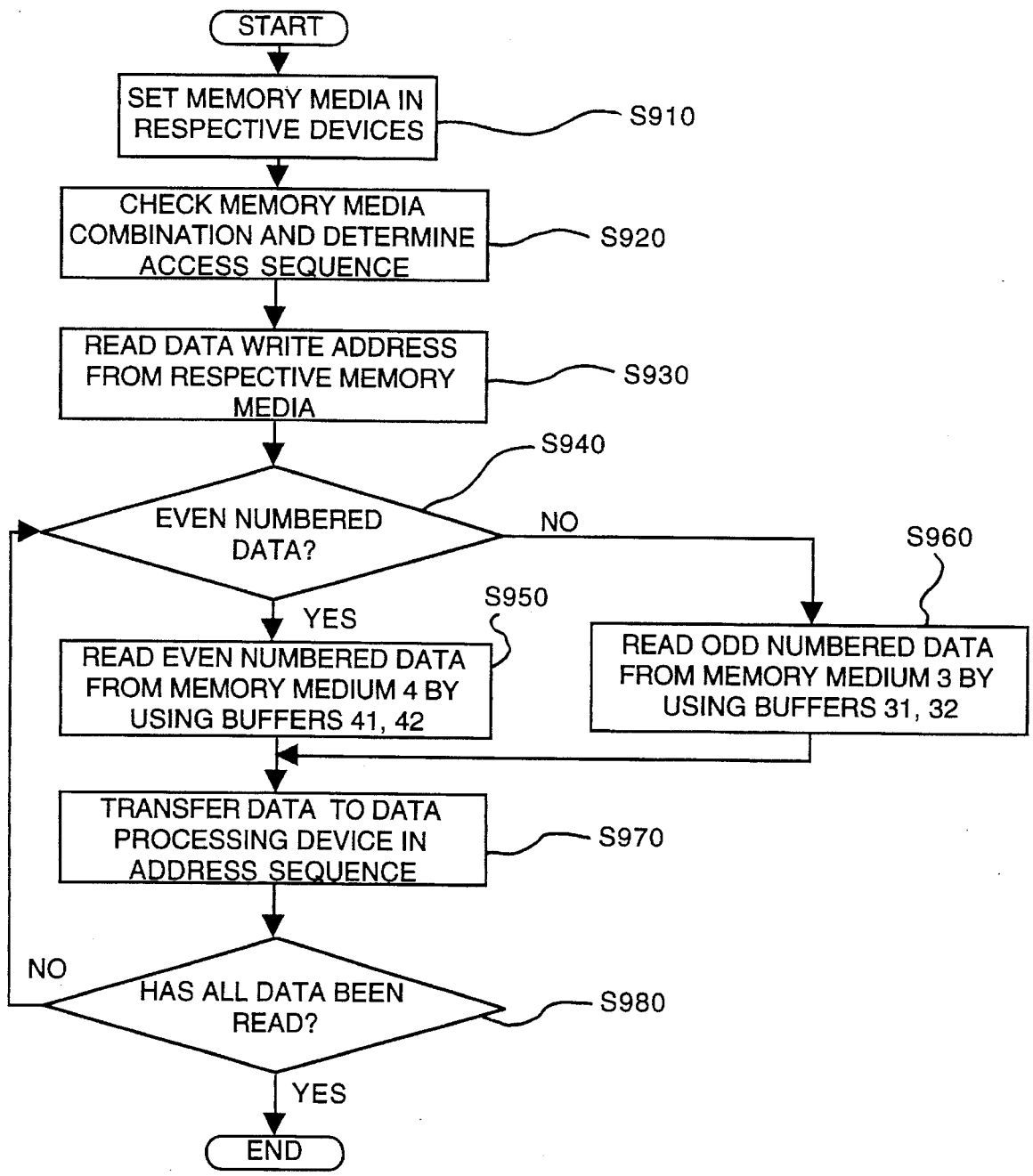
FIG. 9 is a flowchart of a high speed read processing.
Figure 10:
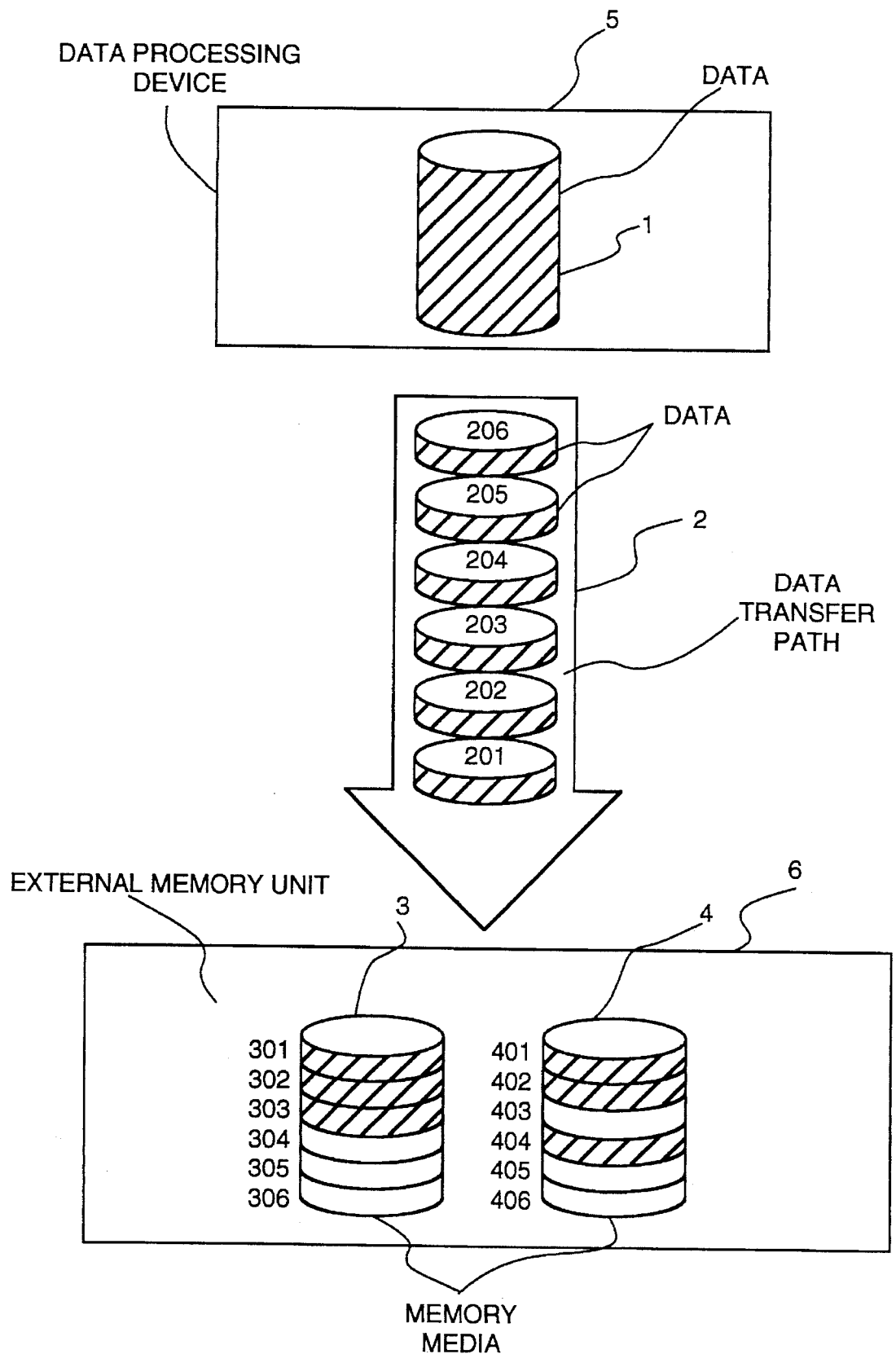
FIG. 10 is a diagram for explaining an embodiment of the present invention in which data to be written is divided and recording information necessary to restore the data before division is respectively stored in the memory media.
Figure 11:
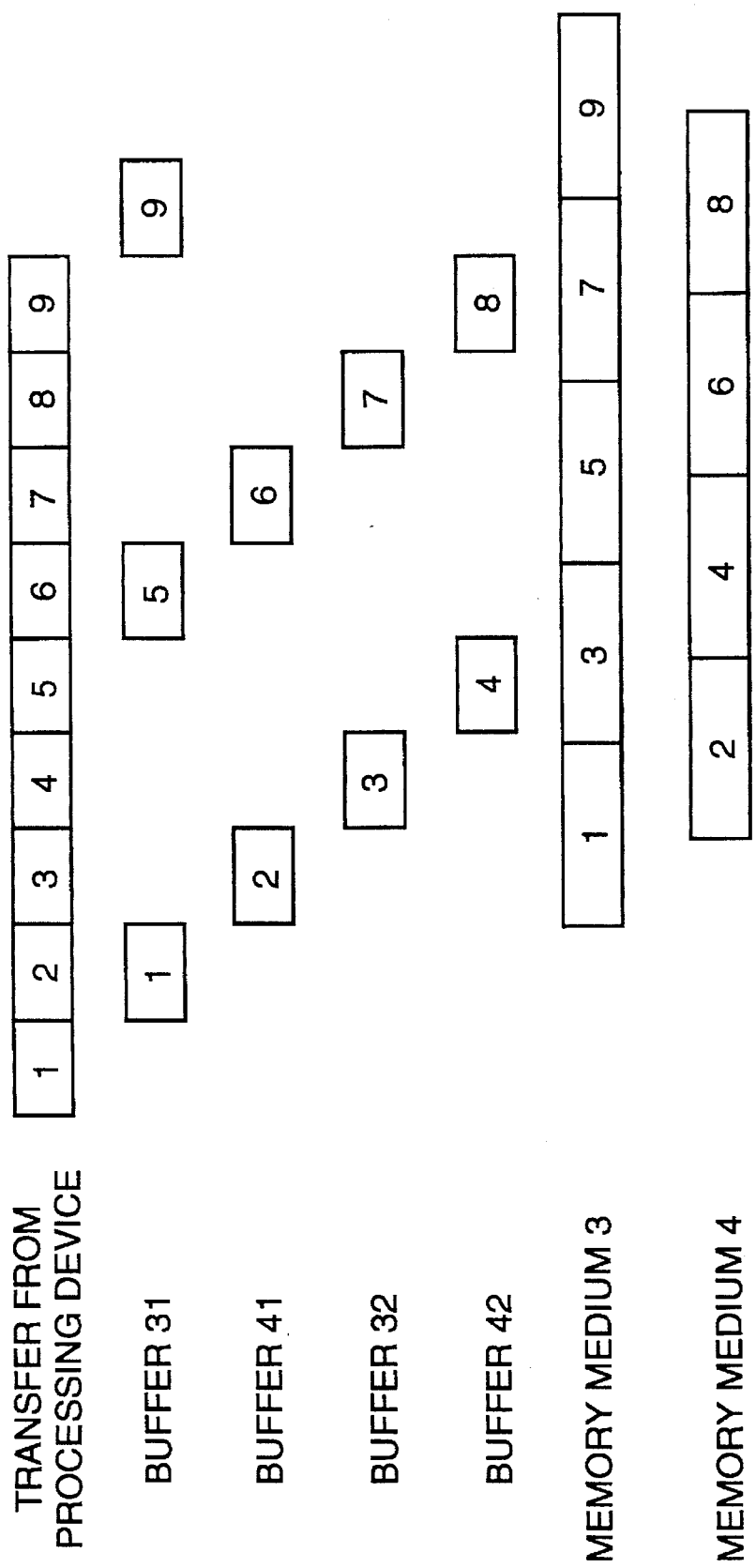
FIG. 11 is a diagram for explaining the data flow within the external memory unit in a write operation.
Figure 12:
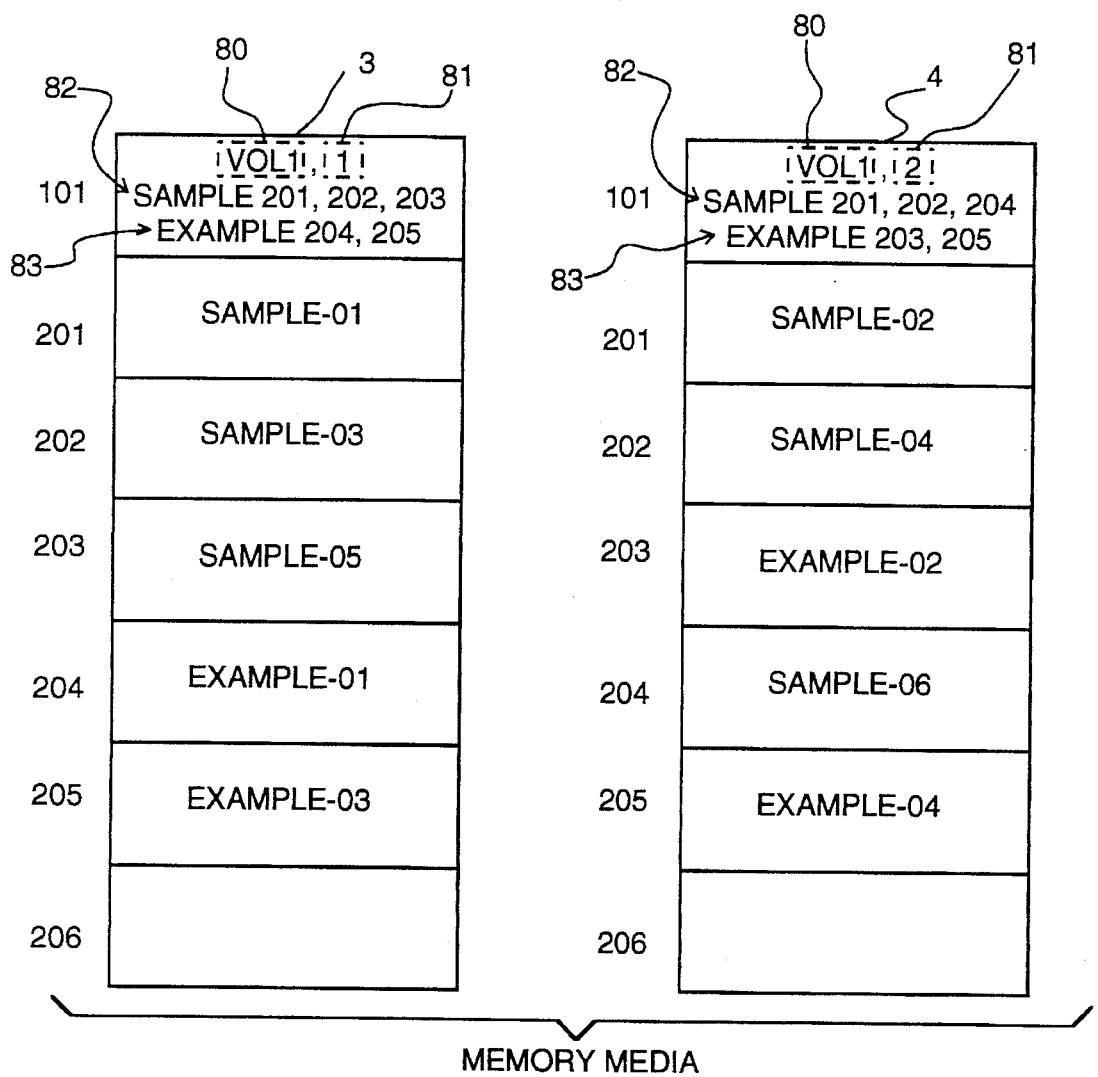
FIG. 12 is a diagram for explaining the memory information stored in the external memory unit in a read operation.
Figure 13:
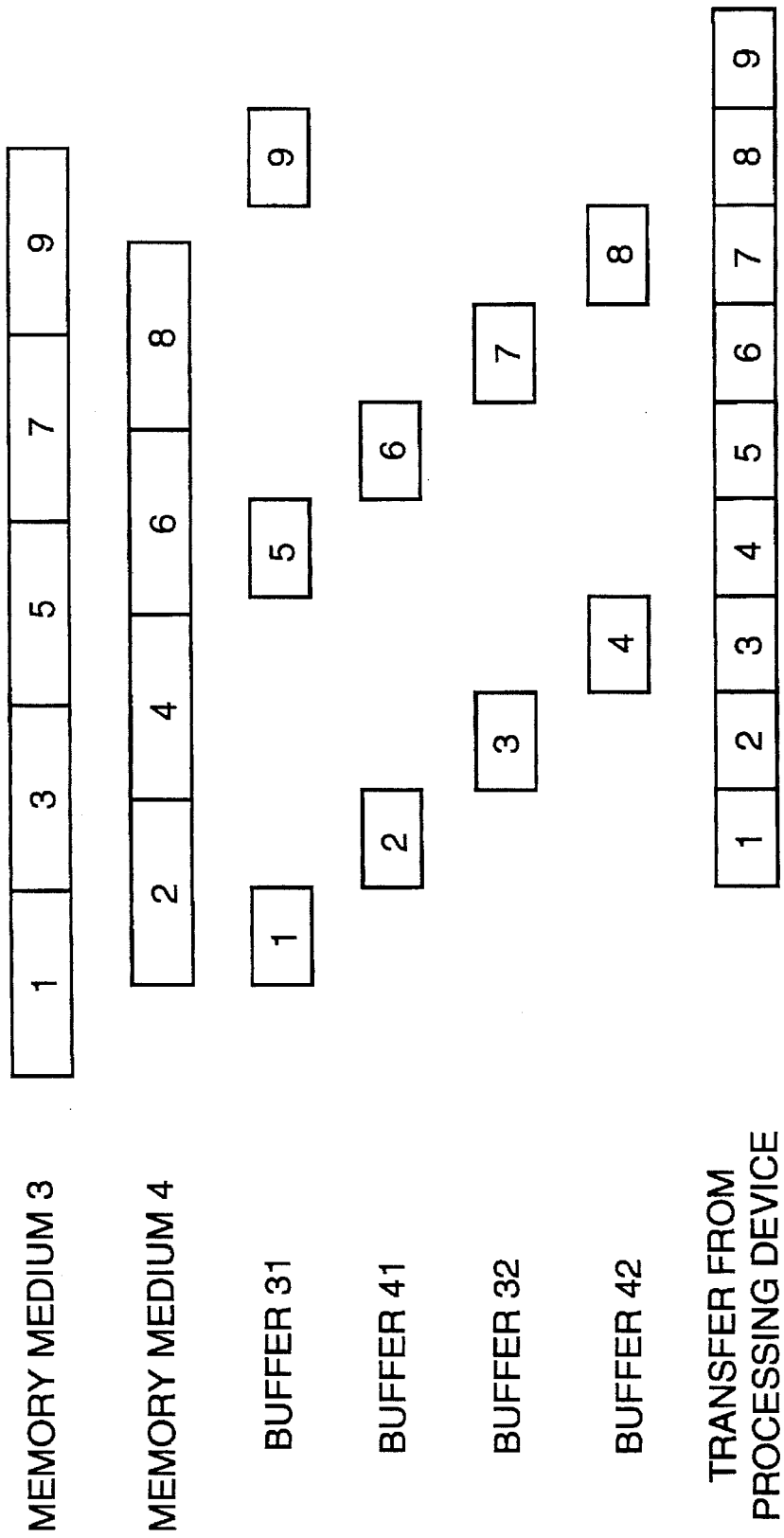
FIG. 13 is a diagram for explaining the data flow in the external memory unit in a read operation.
Figure 21:
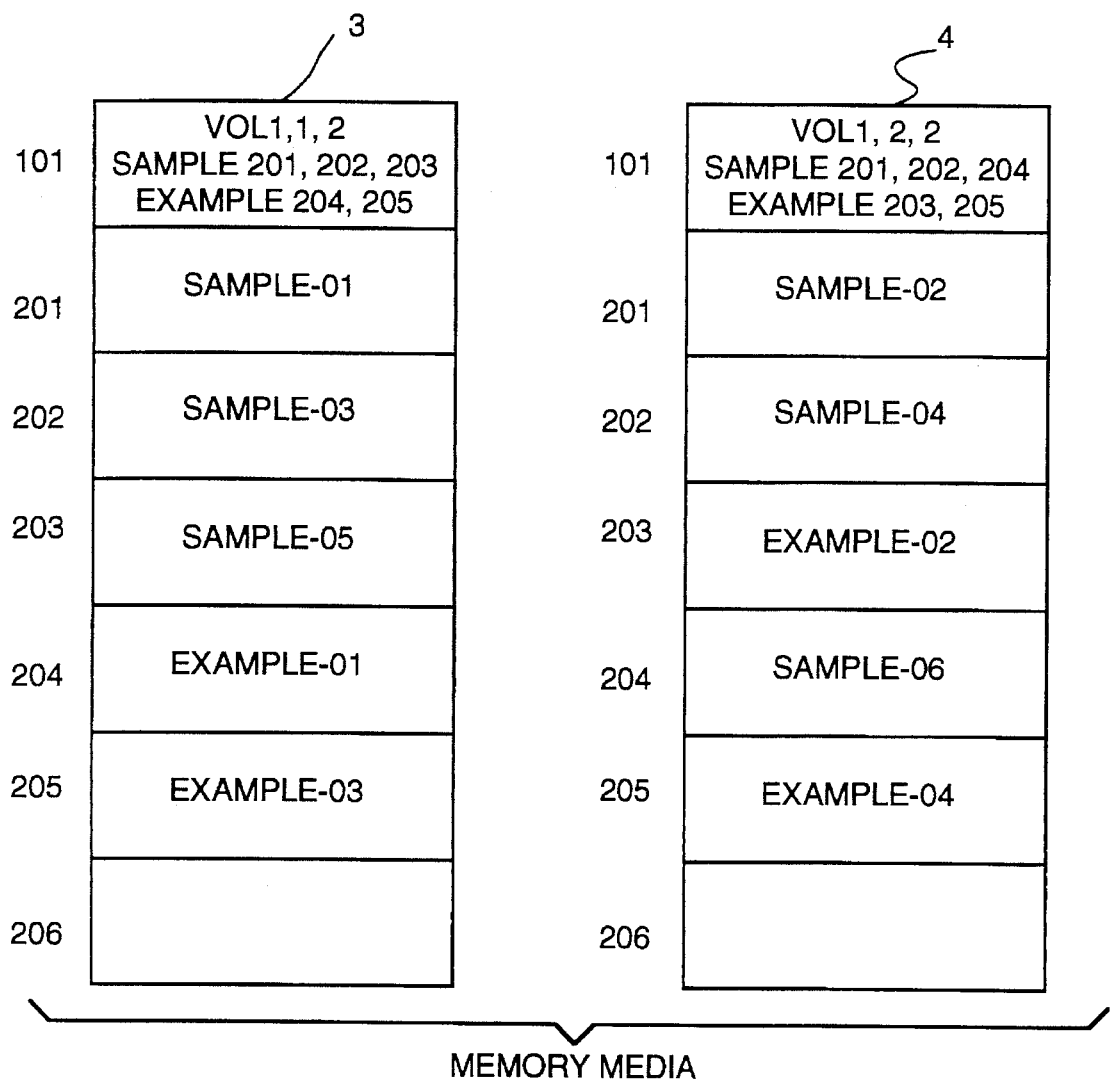
FIG. 21 is a diagram for explaining the memory information stored in the external memory unit in a read operation.

FIG. 8 is a flowchart of a high speed write processing according to an embodiment of the invention, FIG. 9 is a flowchart of a high speed read processing, and FIG. 10 is a drawing for explaining a process in which data to be written is divided. Reference information necessary to restore the data is recorded in the respective memory media. FIG. 11 is a drawing for explaining the data flow within the external memory unit for writing, and FIGS. 12 and 21 are drawings for explaining the memory information stored in the memory media operation (first example, second example). FIG. 13 is a drawing for explaining the data flow in the external memory unit in a read operation and FIG. 14 shows a portion of a data processing system realizing this embodiment.

In this embodiment, a method of dividing and writing divided data in two memory media and reading the written data will be described with reference to FIGS. 8 to 14.

Write processing to memory media according to the present embodiment will be described with reference to FIGS. 10 and 14. Data 1 of a data processing device 5 is transferred to an external memory unit 6 byte by byte through a data transfer path 2 and written in memory media 3 and 4. In this figure, data 201 to 206 each of 1 byte is transferred and divided and written in the memory media 3 and 4.

Figure 14:
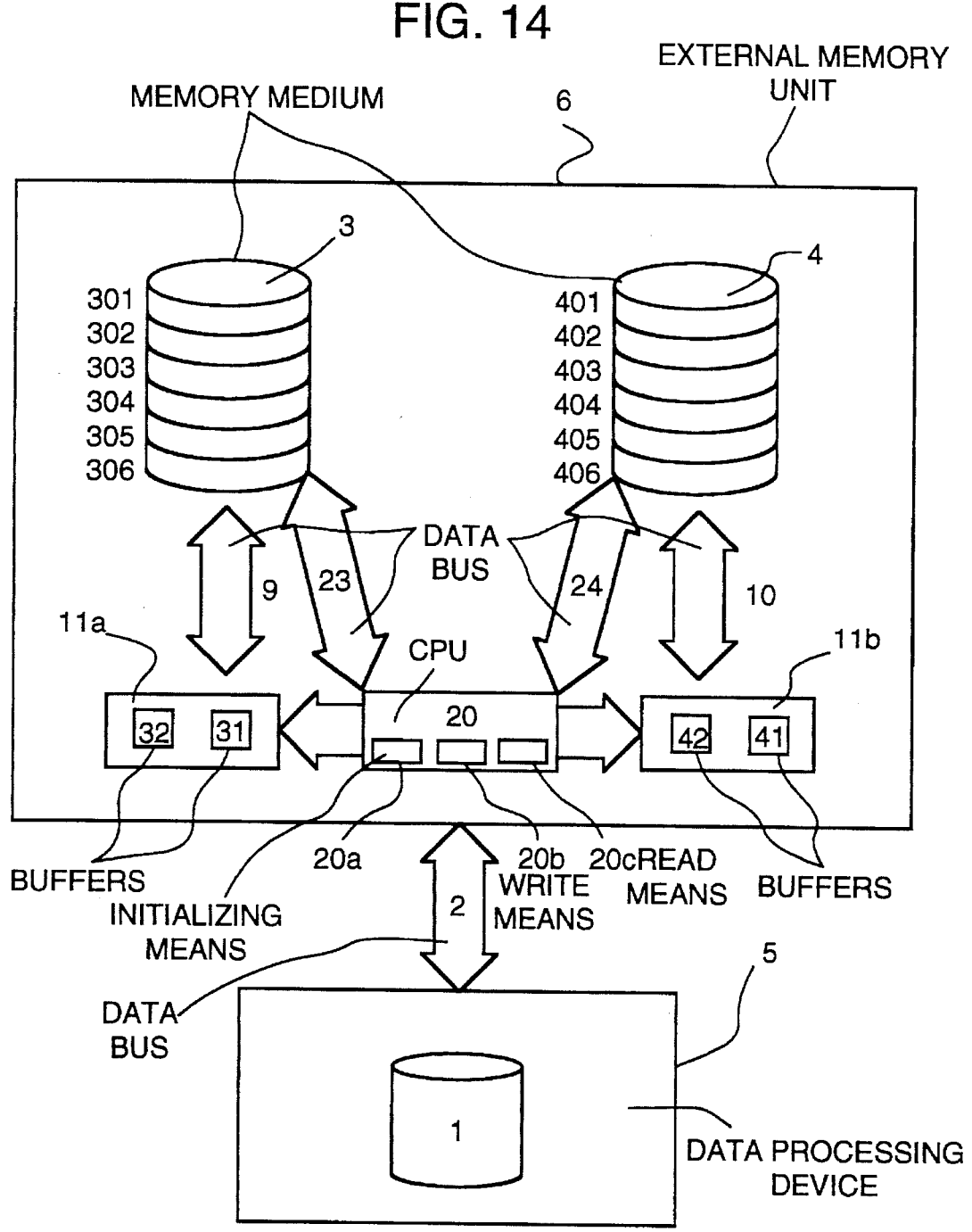
FIG. 14 shows a construction of a data processing system of an embodiment of the present invention.

With reference to FIGS. 14 and 8, the memory media 3 and 4 each having volume name and data write sequence (see FIG. 14) are set in the external memory unit 6 (step S810 in FIG. 8). When the memory media are set, a check processing for volume name and a determination of access sequence shown in the first embodiment are performed (step S820). If memory media that have not been formatted (not initialized) are set, a user is informed that the memory media are not initialized and the check processing is repeated until the initialization processing is correctly completed. Further, it is checked whether or not a combination of the memory media set in the respective devices is correct (volume names of the memory media are the same or all of memory media having volume names indicating a correct combination are set), and, if not correct, an error is displayed for the user and this checking is repeated until the correct memory media are set.

After these checks are completed, a write processing (steps S830 to S870) is performed according to the following procedures. First, the data name is written in the file managing regions of the respective memory media (step S830). In this case the data write procedures will be described with an assumption that data 1 output from the data processing device 5 is divided and written byte by byte in the memory media 3 and 4 in a sequence of: memory medium 4, memory medium 3 and memory medium 4. As shown in FIG. 14, in order to write at high speed, two buffers 31, 32 (collectively 11a) and 41, 42 (collectively 11b) each for 1 byte are prepared for the respective memory media 3 and 4 in the external memory unit 6. In FIG. 14, the processing is performed by a processing device 20 that includes initializing means 20a, write means 20b and read means 20c. Data buses 2, 9, 10 and 21 to 24 are for transferring the data. Data processing device 5 includes a main memory device 1. In FIG. 14, the description, description of other portions within the data processing device 5 are omitted since they are conventional.

The write processing for writing the data 1 from the data processing device 5 in the memory media 3 and 4 is performed according to the following procedures by executing the steps S830 to S870.

(1) First data and second data are transferred to the buffer 31 and the buffer 41, respectively.

(2) Data in the buffer 32 is transferred to the memory medium 3 and third data is transferred to the buffer 32.

(3) Data in the buffer 41 is transferred to the memory medium 4 and fourth data is transferred to the buffer 42.

(4) Data in the buffer 32 is transferred to the memory medium 3 and fifth data is transferred to the buffer 31.

(5) Data in the buffer 42 is transferred to the memory medium 4 and sixth data is transferred to the buffer 41.

The data is written in the memory media 3 and 4 by alternatively using the two sets of buffers 31 and 32 and buffers 41 and 42 in this manner. FIG. 11 shows a flow of the data to the buffers and memory media during the write operation. When the data is written, a top address in which the data is written is recorded in the file managing regions of the respective memory media (steps S850 and S860). The write processing is completed through the above mentioned procedures.

Next, procedures for reading the data divided and stored in the memory media and for restoring the divided data to its original form (data before division) will be described with reference to FIG. 9.

First, when the memory media are set in the respective devices (step S910) of the external memory unit, it is checked whether or not the combination of the set memory media is readable by using the previously mentioned method (the method described with reference to FIGS. 3 to 6) (step S920). If there is any trouble (if it is not readable), an error message is output to a user to notify him of the content of the trouble. Then, a read sequence is read out from the respective memory media (step S920) and the read processing (steps S930 to S980) is performed according to the following procedures.

First, the top address in which the data to be read out is written is read out (step S930). According to the read sequence and the top address thus read out, the divided data is read out and the original data before division is produced. A specific example of the above will be described. In this description, the name of the data to be read out is labeled "sample".

FIG. 12 shows the content of the data stored in the memory media 3 and 4. Regions of the memory media 3 and 4 starting from address 101 and ending at address 200 are file managing regions in which volume names (group information 80, e.g. VOL.1 and VOL.2, respectively) access sequence number 81 (1 and 2, respectively), data name stored ("SAMPLE" 82 and "EXAMPLE" 83) and addresses to which the data are stored are written, respectively. For example, by reading the top addresses of the data name "sample" from the file managing regions of the memory media 3 and 4, it is known that, in the memory medium 3, the data is stored in addresses 201, 202 and 203, and in the memory medium 4, it is stored in addresses 201, 202 and 204.

The data is stored in the regions from addresses 201 of the memory media 3 and 4. In FIG. 12, data names and sequences of the data stored in the respective addresses are shown. For example, the data "sample" is divided and stored in the memory media 3 and 4 in the sequence of address 201 of the memory medium 3, address 201 of the memory medium 4, address 202 of the memory medium 3, address 202 of the memory medium 4, address 203 of the memory medium 3 and address 204 of the memory medium 4.

In order to produce the original data before division by using the write sequence and the top addresses of written data from the memory medium 3 and 4 such as shown in FIG. 12, it is sufficient to read the data in the following sequence:

(1) 1 byte of data starting from the top address 201 of the memory medium 3

(2) 1 byte of data starting from the top address 201 of the memory medium 4

(3) 1 byte of data starting from the top address 202 of the memory medium 3

(4) 1 byte of data starting from the top address 202 of the memory medium 4

(5) 1 byte of data starting from the top address 203 of the memory medium 3

(6) 1 byte of data starting from the top address 204 of the memory medium 4.

The read processing is performed by using two buffers corresponding to the respective devices and detachable memory media, alternately, as in the case of the write processing. With such procedures, it is possible to perform a transfer from the memory media to the buffers of the external memory unit in parallel, so that high speed read becomes possible.

When the initializing processing is performed as shown in FIG. 23, contents of the data stored in the memory media 3 and 4 are shown by FIG. 21 instead of FIG. 12.

Next, another method for dividing data, writing the divided data in two memory media and reading the written data will be described with reference to FIGS. 15 to 19 and 22.

Figure 15:
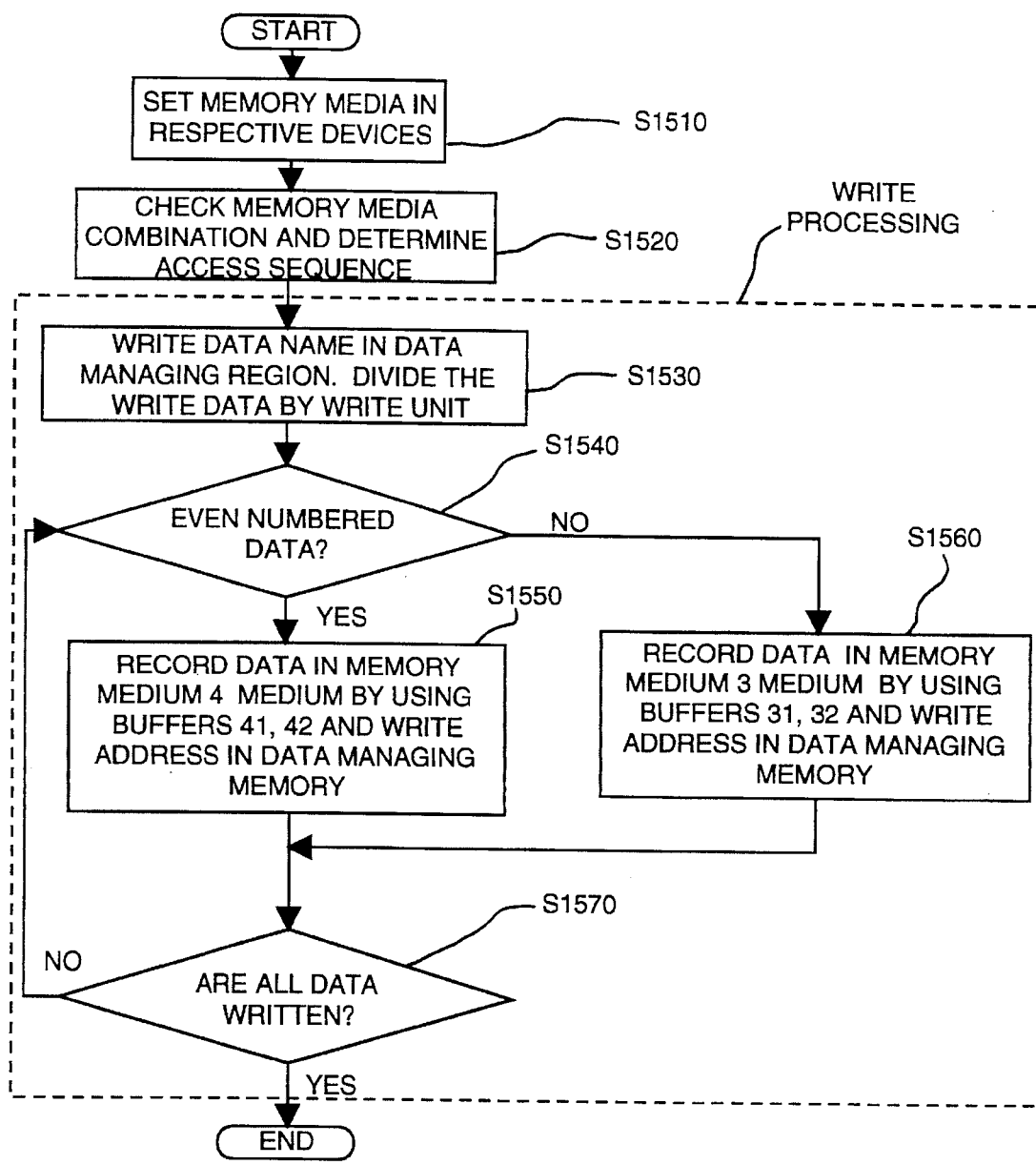
FIG. 15 is a flowchart of a high speed write operation.
Figure 16:
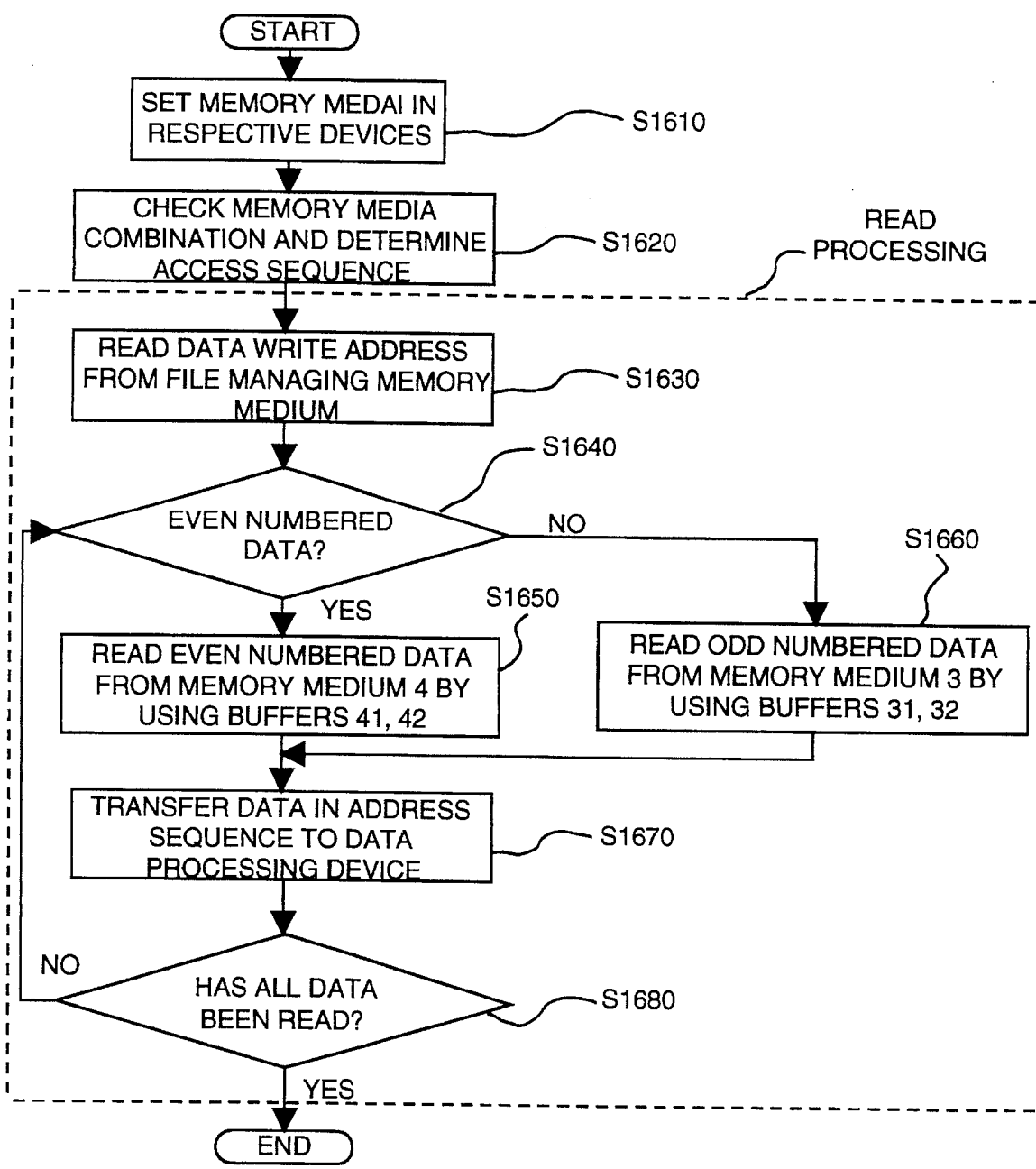
FIG. 16 is a flowchart of a high speed read operation.
Figure 18:
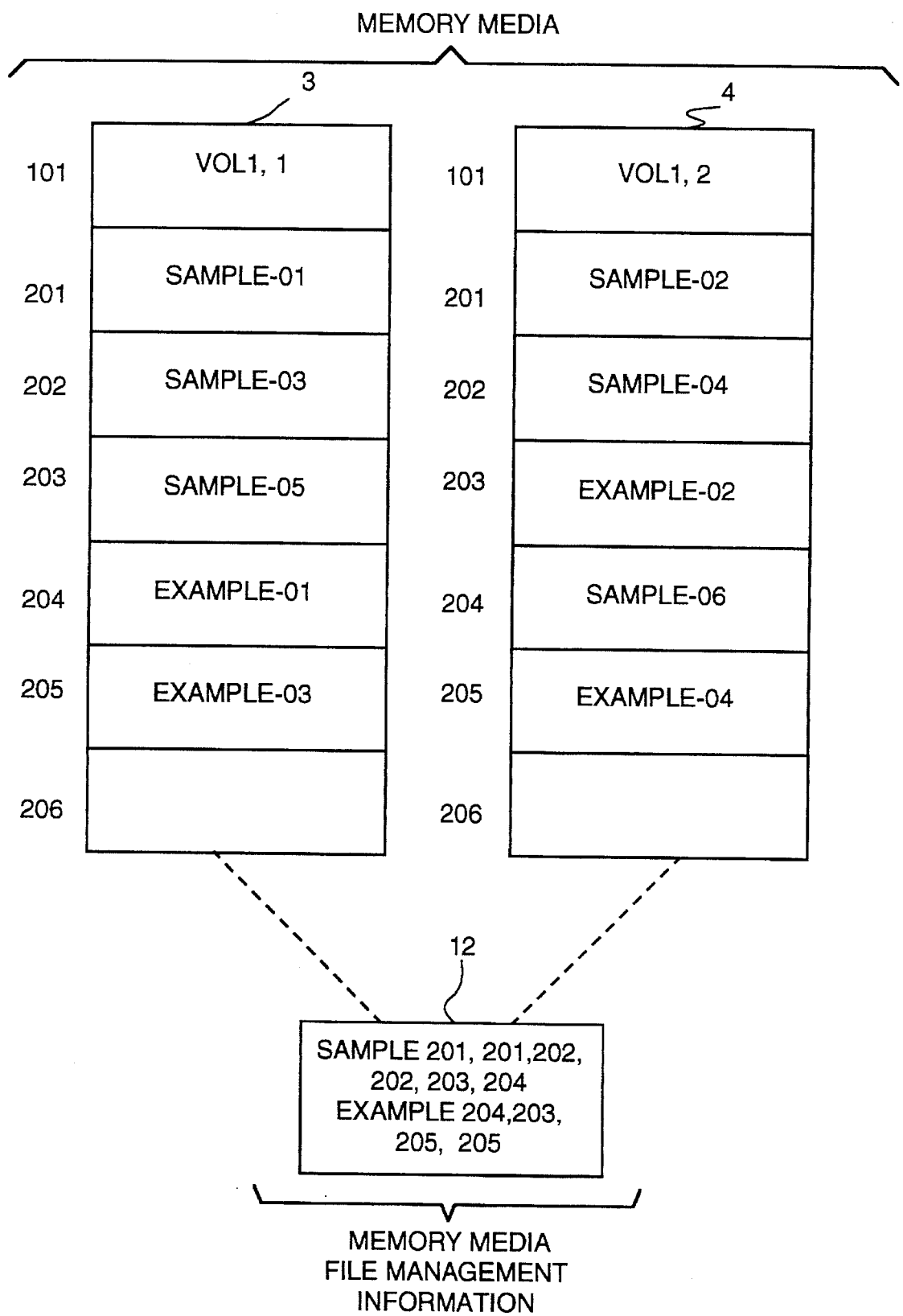
FIG. 18 is a diagram for explaining the information stored in an external memory unit to which a read operation is performed.
Figure 22:
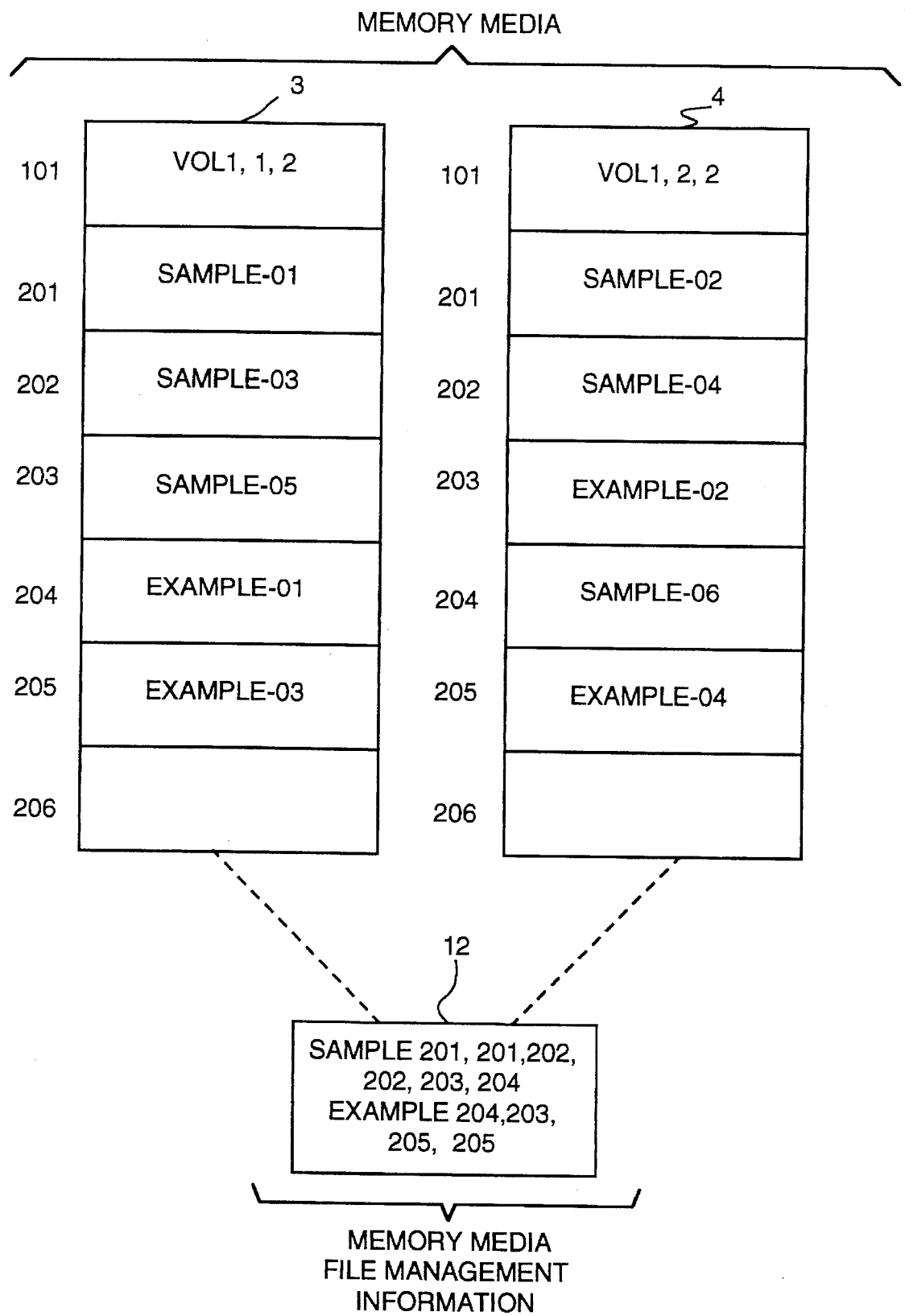
FIG. 22 is a diagram for explaining the information stored in an external memory unit to which a read operation is performed.

FIG. 15 is a flowchart of a high speed write proces, FIG. 16 is a drawing for explaining a proces of dividing the data to be written, recording, in data managing regions of memory media, information necessary to restore the data to its original form before division, and writing the divided data in parallel. FIGS. 18 and 22 are drawings for explaining the information stored in an external memory unit to which a read operation is performed (third and fourth examples) and FIG. 19 shows a construction of a portion of the data processing system for realizing this embodiment.

Figure 17:
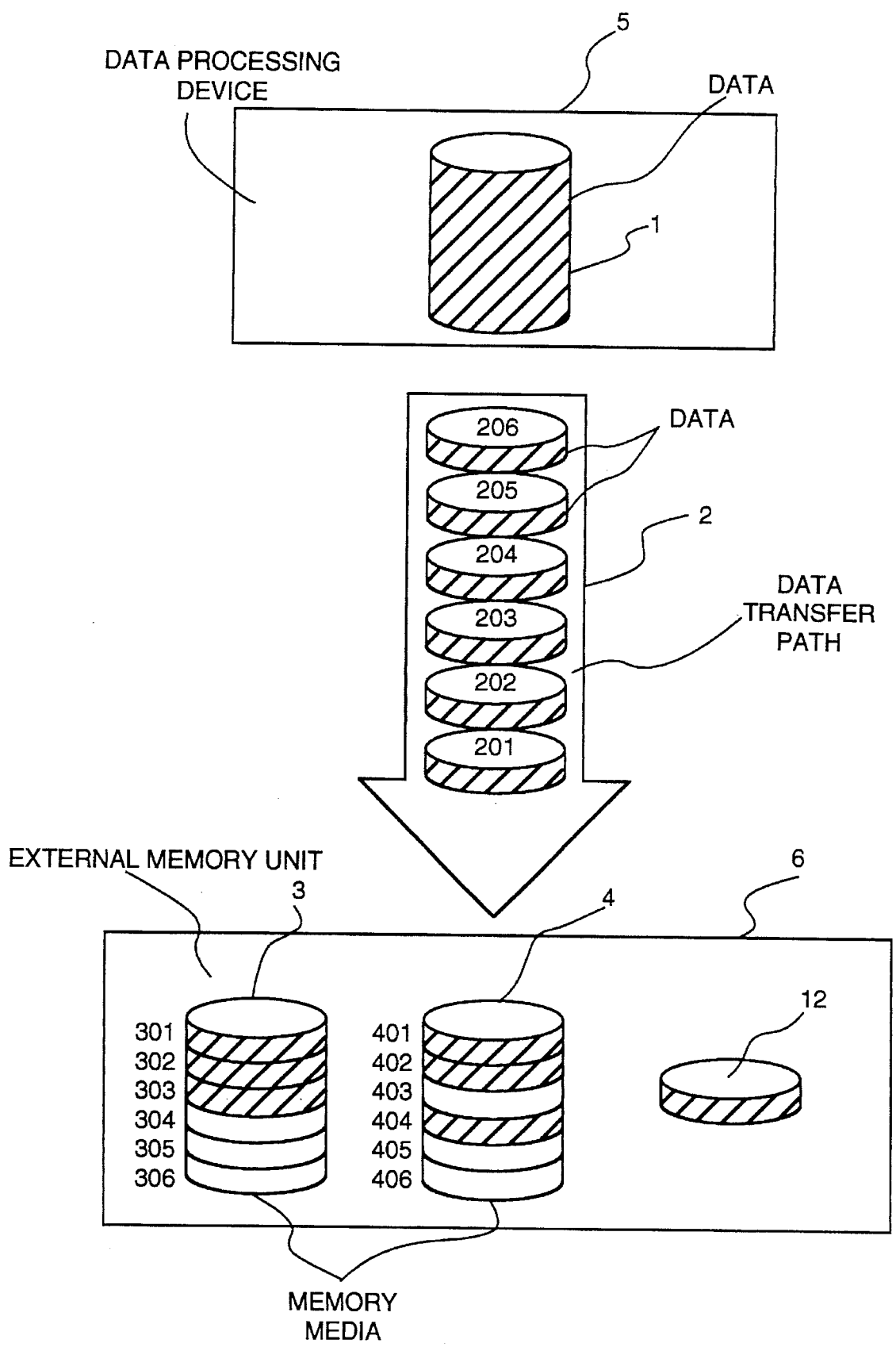
FIG. 17 is a diagram for explaining an embodiment of the present invention in which data to be written is divided and recording information necessary to restore the data before division is respectively stored in the memory media.

First, a concept of the write processing to the memory media, according to the present invention will be described with reference to FIG. 17. Data 1 of a data processing device 5 is transferred to an external memory unit 6 byte by byte through a data transfer path 2 and written in memory media 3 and 4. In this figure, data 201 to 206 each of 1 byte are transferred and divided and written in the memory media 3 and 4.

Figure 19:
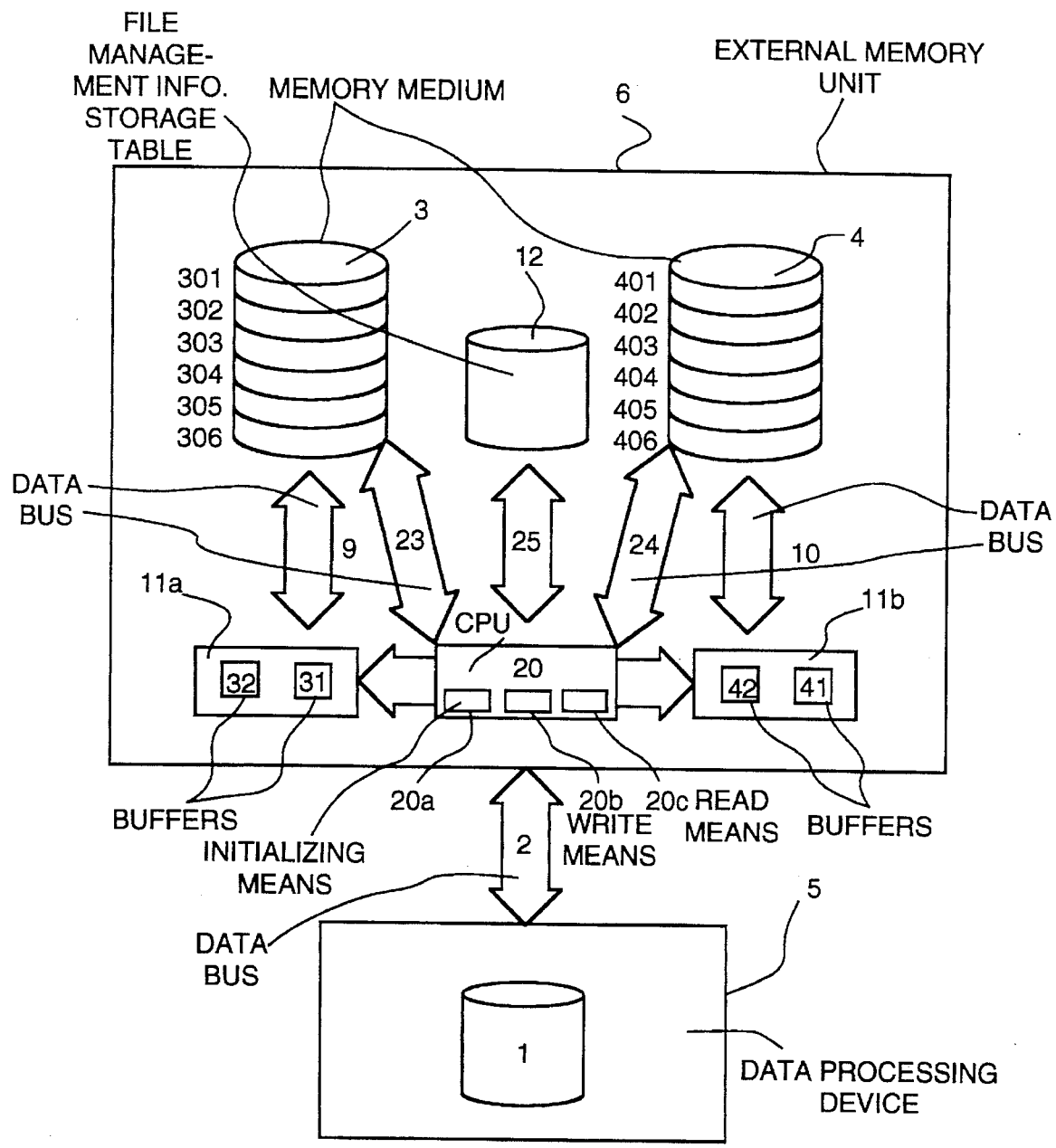
FIG. 19 shows a construction of a data processing system according to an embodiment of the present invention.

To illustrate the write processing of data to the memory media, reference is made to FIGS. 15 and 19. The memory media 3 and 4 each having a volume name and a data write sequence (see FIG. 18) are set in the external memory unit 6 (step S1510 in FIG. 15). When the memory media are set, a check processing for the volume name and a determination of the access sequence shown in the first embodiment are performed (step S1520). If memory media which is not formatted (not initialized) are set, a user is informed that the memory media are not initialized and the check processing is repeated until the initialization processing is completed correctly. Further, it is checked whether or not a combination of the memory media set in the respective devices is correct (volume names of the memory media are the same or all of memory media having volume names indicating a correct combination are set), and, if not correct, an error display is given to the user and this checking is repeated until the correct memory media are set.

After these checks are completed, the write processing (steps S1530 to S1570) is performed according to the following procedures, wherein the data write procedures will be described with an assumption that the data 1 output from the data processing device 5 is divided and written byte by byte in the memory media 3 and 4 in a sequence of: memory medium 4, memory medium 3 and memory medium 4.

The embodiment of the invention shown in FIG. 19 is similar to that of FIG. 14, but includes a memory media file management storage device 12, such as a hard disk, which does not store the data being divided and written to the detachable memory media. Further details of FIG. 19 are omitted herein since the system is otherwise the same as the one shown in FIG. 14. The write processing for writing the data 1 from the data processing device 5 in the memory media 3 and 4 is performed according to the following procedures by executing the steps S1530 to S1570.

(1) First data and second data are transferred to the buffer 31 and the buffer 41, respectively.

(2) The data in the buffer 31 is transferred to the memory medium 3 and third data is transferred to the buffer 32.

(3) The data in the buffer 41 is transferred to the memory medium 4 and fourth data is transferred to the buffer 42.

(4) The data in the buffer 32 is transferred to the memory medium 3 and fifth data is transferred to the buffer 31.

(5) The data in the buffer 42 is transferred to the memory medium 4 and sixth data is transferred to the buffer 41.

The data is written in the memory media 3 and 4 by alternately using the two sets of buffers 31 and 32 and buffers 41 and 42 in the manner shown in FIG. 11. When the data is written, a top address in which the data is written is recorded in the file managing regions of the respective memory media (steps S1550 and S1560). The write processing is completed through the above mentioned procedures.

Next, procedures for reading the data divided and stored in the memory media and restoring the original data (data before division) will be described with reference to FIG. 16. First, when the memory media are set in the respective devices (step S1610), it is checked whether or not the combination of the set memory media is readable by using the method described in the first embodiment (step S1620). If there is any trouble (if it is not readable), an error message is output to the user to notify him of the content of the trouble. Then, a read sequence is read out from the respective memory media (step S1620) and the top address in which the data to be read out is written is read out (step S1630). According to the read sequence and the top address thus read out, the divided data is read out and the original data before division is produced (steps S1640 to S1680).

A specific example of the above will be described. In this description, the name of the data to be read out is labeled "sample". By reading the top addresses of the data named "sample" from a memory media 12 for the file management in FIG. 18, it is known that, in the memory medium 3, the data is stored in addresses 201, 202 and 203 (odd numbered addresses) and, in the memory medium 4, it is stored in addresses 201, 202 and 204 (even numbered addresses).

The data is stored in the regions from addresses 201 of the memory media 3 and 4. In FIG. 18, data names and sequences of the data stored in the respective addresses are shown. For example, the data "sample" is divided and stored in the memory media 3 and 4 in the sequence of address 201 of the memory medium 3, address 201 of the memory medium 4, address 203 of the memory medium 3, address 202 of the memory medium 4, address 203 of the memory medium 3 and address 204 of the memory medium 4.

In order to restore the original data (before division) by using the write sequence and the top addresses of written data from the memory medium 3 and 4 such as shown in FIG. 18, it is sufficient to read the data in the following sequence:

(1) 1 byte of data starting from the top address 201 of the memory medium 3

(2) 1 byte of data starting from the top address 201 of the memory medium 4

(3) 1 byte of data starting from the top address 202 of the memory medium 3

(4) 1 byte of data starting from the top address 202 of the memory medium 4

(5) 1 byte of data starting from the top address 203 of the memory medium 3

(6) 1 byte of data starting from the top address 204 of the memory medium 4.

The read processing is performed by using two buffers corresponding to the respective devices, alternately as in the case of the write processing. FIG. 13 shows a data flow during reading. With such procedures, it becomes possible to perform a transfer from the memory media to the buffers of the external memory unit in parallel, so that high speed read becomes possible.

When the initializing processing is performed as shown in FIG. 23, contents of data stored in the memory media 3 and 4 are shown by FIG. 22 instead of FIG. 18.

Figure 20:
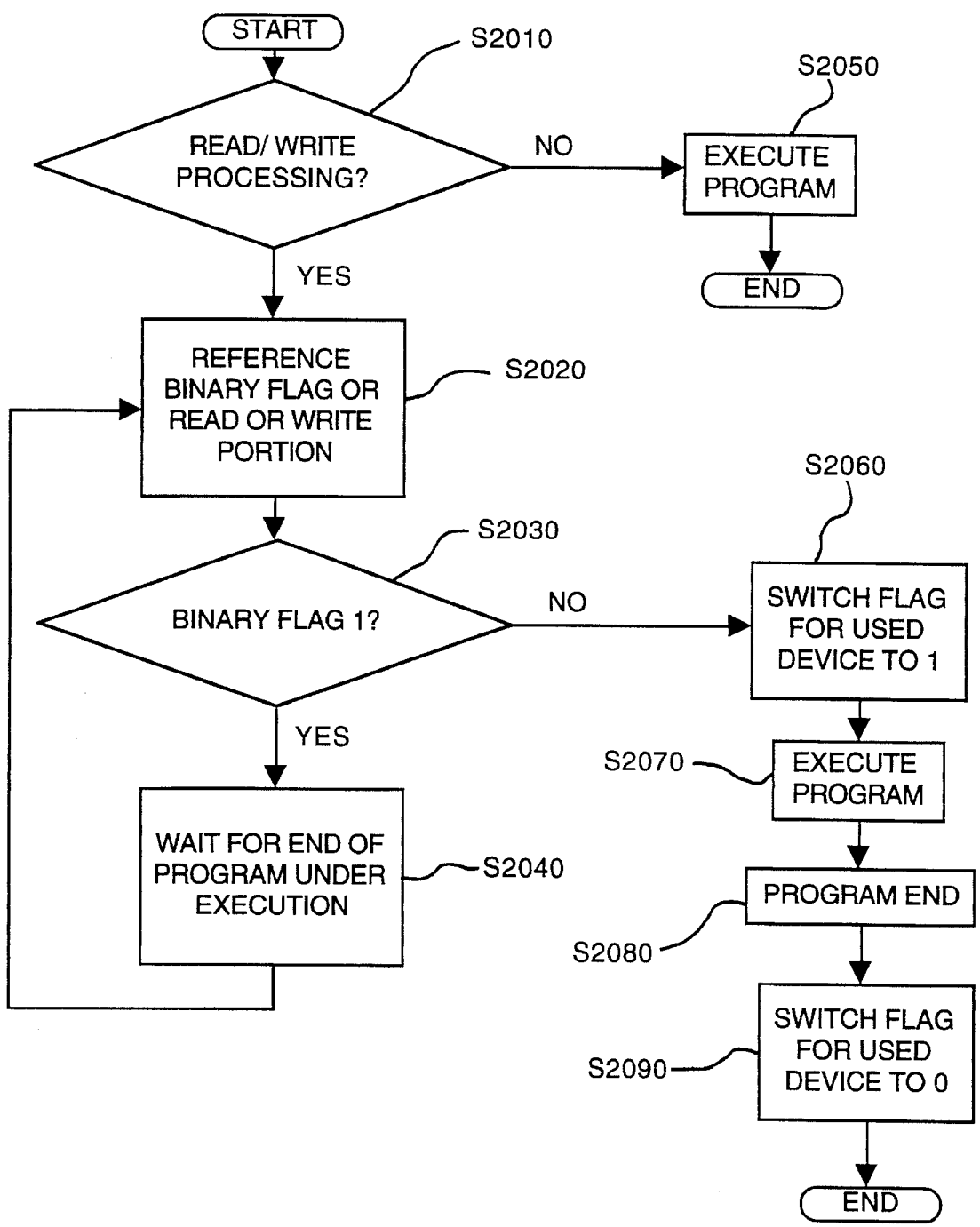
FIG. 20 is a flowchart of simultaneously writing or reading a plurality of data with respect to respective memory media.

FIG. 20 is a flowchart of a procedure for separately and simultaneously writing a plurality of data or simultaneously reading the same, which is an embodiment of the present invention. This embodiment relates to a processing method (access control to devices) for separately and simultaneously writing a plurality data or simultaneously reading the same.

First, memory media 3 and 4 having volume names and an access sequence are set in a detachable external memory unit 6. In a case where the volume names and the access sequence are not registered, the aforementioned initialization processing is performed to complete a registration of the volume names and the access sequence before the write operation. After the memory media having the volume names and the access sequence are set, the write or read processing is performed according to the following procedures.

First, the procedure will be described briefly. A binary flag is prepared for each device. Memory media to be read from or written to are preliminarily assigned every program to be executed and, when, for example, a program is executed, a flag for a device assigned by the program is switched from "0" to "1" and, when the program ends, it is switched from "1" to "0". By using such a binary flag, it is possible to prevent a double assignment of the memory media (doubled write or read with respect to a memory medium).

As shown in FIG. 20, when a program execution instruction is issued, it is checked whether or not there is a memory medium read or write procedure in the program to be executed (step S2010). If there is no such processing, the program is executed (step 2050).

If there is a read or write processing, it is shifted to a step 2020 in which a flag for the device assigned (to describe it in the program) to the memory medium used by the program to which the execution instruction is issued (with respect to which read or write is to be performed) is referenced.

If the flag referenced is "0", the flag for the device is made "1" (step S2060) and the program is executed (step S2070) and, when the program ends (step S2080), the flag for the device used is returned to "0" (step S2090). When the flag is judged as "1" in the step S2030, an execution wait processing is performed (step S2040) and the procedure returns to the step S2020 (that is, the execution wait processing is performed until the flag becomes "0").

With this processing, it becomes possible to simultaneously write or read a plurality of data in separate memory media without performing simultaneous write or read with respect to a common memory medium. Although the present invention has been described with reference to the embodiments, the present invention is not limited to such embodiments and various modifications thereof are, of course, possible without departing from the scope thereof.

Figure 25:
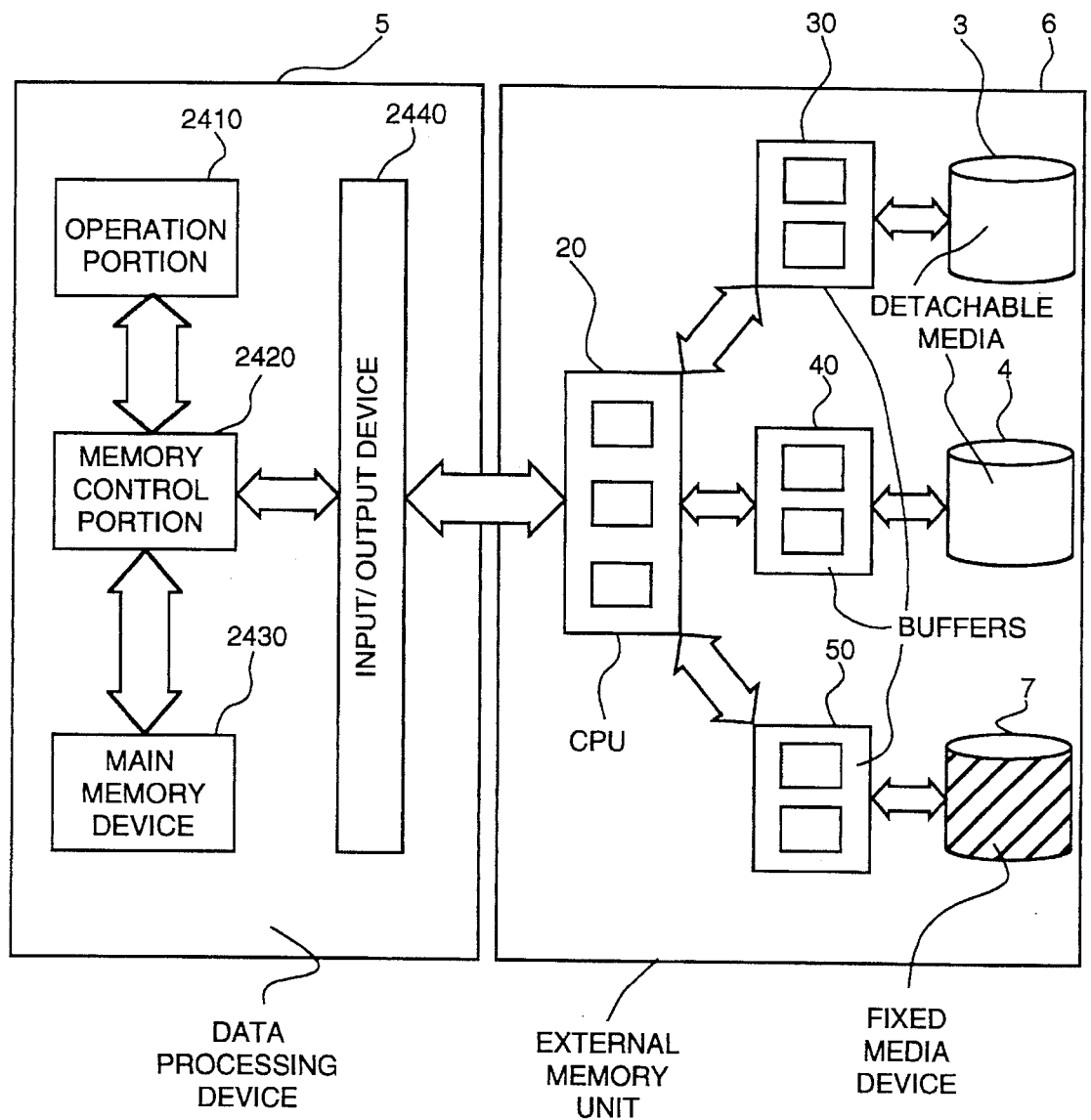
FIG. 25 shows a data processing system according to the present invention wherein the external memory unit has a hard disk.
Figure 26:
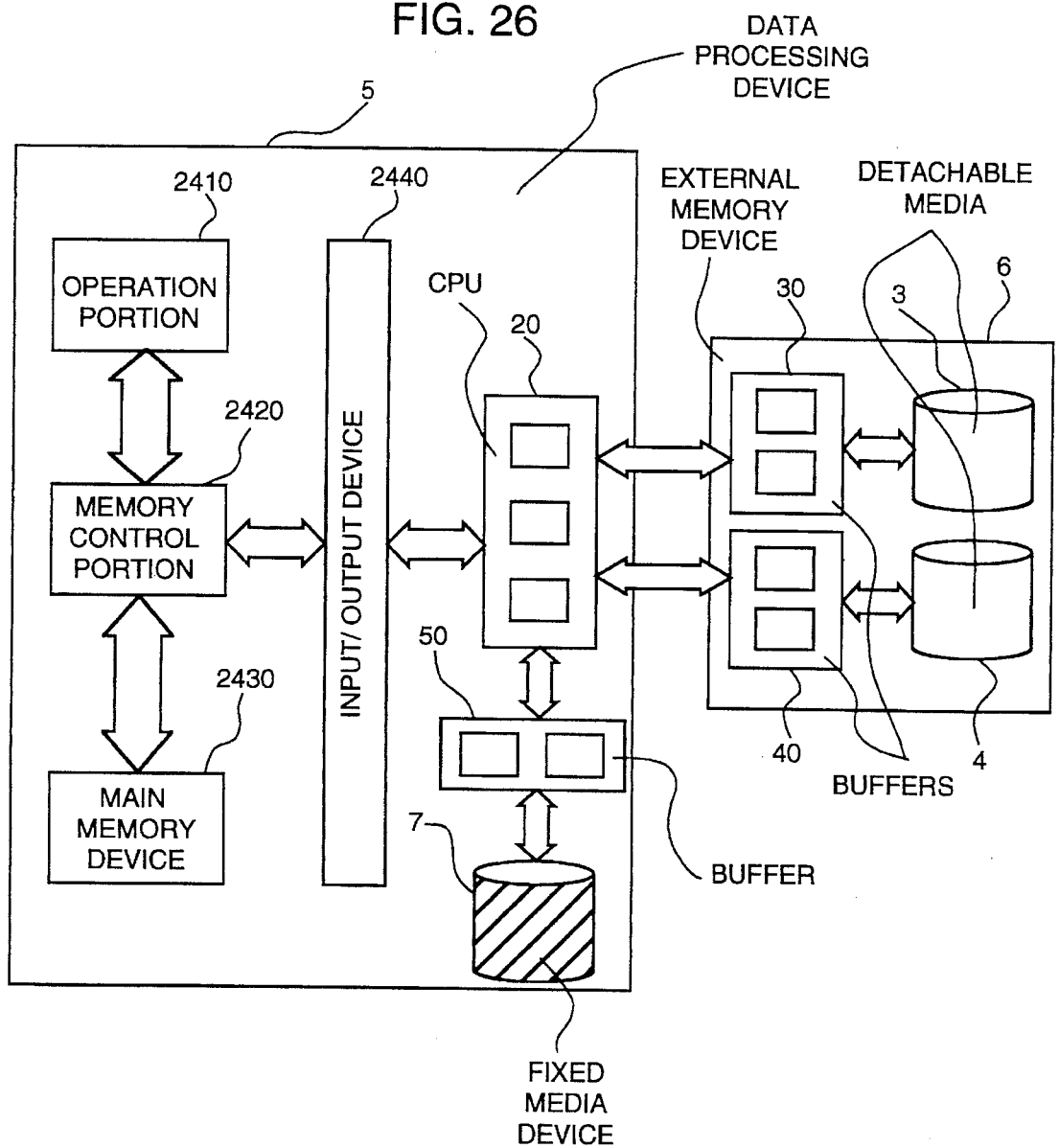
FIG. 26 shows a data processing system according to the present invention wherein a hard disk is included in the data processing device.

For example, as shown in FIGS. 25 and 26, the system set forth in FIG. 24 can be modified to include an internal device having fixed medium 7 within the external memory unit 6, such as a hard disk, that is used in combination with the detachable device media 3 and 4. It may not be necessary to store sequence information on the fixed media device 7 since a hardware circuit could be provided to establish that the fixed media device 7 is used as the number one device when data is divided and stored among the fixed media device and the detechable memory media devices. The remainder of the components are the same as those shown in FIG. 24, with reference to FIGS. 14 and 19, with the exception of buffers 30, 40 and 50, which operate in the same manner as buffers 11a and 11b in FIGS. 14 and 19 for the respective memory media devices to which they are connected.

FIG. 26 is similar to FIG. 25 and the same reference numbers apply to similar components. In FIG. 26, the fixed media device 7, such as a hard disk, is provided as part of the data processing system, and the memory media of device 7 can be used with memory media 3, 4 when data is divided and written to the external memory unit 6. Preferably, in this embodiment, the data is divided by a special purpose CPU in the data processing device 5. Then, the subunits of divided data are written to device 7 and the memory media 3 and 4, in parallel.

As described hereinbefore, the following effects are obtained by using the present invention.

(1) A plurality of data can be simultaneously read or written.

(2) It is possible to increase transfer speed between an external memory unit and a data processing device proportionally to the number of memory media which can be written or read simultaneously.

For example, when the number of memory media which can be accessed simultaneously is 5, transfer time becomes about ⅕, compared with the conventional single bit serial access system.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A peripheral memory unit for use with a data processing system, comprising:

said memory unit having a plurality of detachable memory media for storage of data;

means for dividing units of data to be stored into a series of divided subunits of data;

means for initializing each of said memory media including storing reference information in each of said memory media to be used for restoring said divided subunits of data into said units of data during a read operation;

means for writing in parallel said subunits of data in accordance with said reference information among said plurality of memory media;

means for reading said reference information stored in said memory media;

means for reading in parallel said divided subunits of data in accordance with said reference information read from said plurality of memory media; and means for receiving and restoring said divided subunits of data read by said divided data reading means and for outputting said divided subunits as said units of data;

wherein said writing means writes said subunit of data in a sequence and;

wherein said means for reading said reference information in response to receiving a read/write instruction first reads said group information from each of said memory media to determine if all said memory media in said memory unit are part of said predetermined group of said memory media required for executing the read/write instruction, and then reads said partial sequence data when it is determined that all of said memory media required for executing the read/write instruction are present; wherein said means for reading said reference information includes means for determining an access sequence from said partial sequence data; and further wherein said means for reading said subdivided data reads said subunits from said memory media in accordance with said access sequence.

2. A memory unit according to claim 1, wherein said initializing means stores group information identifying a predetermined group of said plurality of memory media to which data is to be written to or read from as said reference information.

3. A memory unit according to claim 2, wherein said means for reading said reference information, in response to receiving a read or write instruction, first reads said group information from each of said memory media to determine if all of said memory media in said memory unit are part of said predetermined group of said memory media required for executing the read or write instruction, and then outputs a read or write instruction interruption signal if any of the memory media in said memory unit is not within said predetermined group.

4. A memory unit according to claim 2, wherein said writing means writes said divided subunits of data to said predetermined group of memory media in a sequence and said initializing means writes partial sequence data in each of said memory media identifying a place in said sequence that each said memory media has been assigned by said writing means as said reference information.

5. A memory unit according to claim 4, wherein said means for reading said reference information, in response to a read or write instruction, reads said group information from each of said memory media to determine if all of said memory media in said memory unit are part of said predetermined group of said memory media, and also reads said partial sequence data for determining an access sequence used by said reading means for reading said subunits of data to provide said subunits to said restoring means in said sequence.

6. A memory unit according to claim 1, wherein said writing means writes said subunits of data among said plurality of memory media in a sequence and said initializing means writes partial sequence data in each of said memory media identifying a place in said sequence that each said memory media has been assigned by said writing means, as said reference information.

7. A peripheral memory unit for use with a data processing system, comprising:

said memory unit having a central processing unit and a plurality of detachable memory media for storage of data;

means for dividing units of data to be stored into a series of divided subunits of data;

means for initializing each of said memory media including generating and storing reference information including group information identifying a predetermined group of said plurality of memory media to which data is to be written to or read from each of said memory media to be used for reading and restoring said divided subunits of data;

means for writing in parallel said subunits of data in a sequence among said group of memory media;

means for reading said reference information and for reading in parallel said divided subunits of data from said group of memory media in accordance with said reference information and for restoring said divided subunits into said units of data;

wherein said means for reading said reference information, in response to receiving a read or write instruction, determines if all of said memory media in said memory unit are part of said predetermined group of said memory media required for executing the read or write instruction; and wherein said central processing unit suspends execution of said read or write instruction when one of said memory media is determined to not be part of said predetermined group;

wherein said means for reading said reference information reads said partial sequence data and determines an access sequence from said partial sequence data; and further wherein said means for reading said subunits of divided data reads said subunits from said memory media in accordance with said access sequence.

8. A memory unit according to claim 7, wherein said initializing means writes partial sequence data in each of said memory media of said predetermined group identifying a place in said sequence that each said memory media has been assigned by said writing means.

9. A memory unit according to claim 7, wherein said means for reading said reference information outputs an error notice to a user if any of the memory media in said memory unit is determined to be not within said predetermined group.

10. A memory unit according to claim 7, wherein, in response to said central processing unit executing a write instruction, said writing means writes addresses of the written data in said memory media.

11. A memory unit according to claim 8, wherein, in response to said central processing unit executing a write instruction, said writing means writes divided data having one of odd and even addresses alternately to respective one of two of said memory media as said predetermined group of said memory media and writes addresses of the written data respectively in said two memory media.

12. A memory unit according to claim 11, wherein, in response to a read instruction, said reference information reading means reads said odd and even addresses and said reading means reads said divided subunits of data alternately from the respective ones of said two memory media in accordance with said odd and even addresses.

13. A memory unit according to claim 12, wherein said read and said write instructions are performed in parallel.

14. A memory unit according to claim 7, further comprising an internal fixed storage device wherein, in response to said central processing unit executing a write instruction, said writing means writes addresses of the divided subunits of data written in said memory media to said storage device.

15. A memory unit according to claim 8, further comprising an internal fixed storage device wherein, in response to said central processing unit executing a write instruction, said writing means writes said divided subunits of data having one of odd and even addresses alternately to respective one of two of said memory media as said predetermined group of said memory media and writes addresses of the written data in said storage device.

16. A memory unit according to claim 15, wherein, in response to a read instruction, said reference information reading means reads said odd and even addresses stored in said storage device and said reading means alternately reads from respective ones of said two memory media in accordance with said odd and even addresses.

17. A peripheral memory unit for use with a data processing system, comprising:

said memory unit having a plurality of means for receiving respective detachable memory media for storage of data;

means for dividing units of data to be stored into a series of divided subunits of data;

means for initializing each of said memory media including generating and storing reference information including group information identifying a predetermined group of said plurality of memory media to which data is to be written to or read from reference information in each of said memory media to be used for restoring said divided subunits of data into said units of data during a read operation;

means for writing in parallel said subunits of data in a sequence to each of said memory media received in said receiving;

means, in response to receiving a read or write instruction, for reading said reference information of each of said respective memory media received in said plurality of receiving means to determine if all of said memory media in said predetermined group are received in said corresponding receiving means; and said central processing unit suspending execution of said read/write instruction when at least one of said memory media of said predetermined-group is determined to not be in a corresponding one of said receiving means;

wherein said means for reading said reference information, in response to receiving a read or write instruction, reads said group information from each of said memory media to determine if all of said memory media in said memory unit are part of said predetermined group of said memory media required for executing the read/write instruction, and also reads said partial sequence data for determining an access sequence used by said reading means for reading said subunits of data in said sequence in which said subunits were written by said writing means.

18. A memory unit according to claim 17, wherein said initializing means stores data identifying all of said memory media within said predetermined group in each of said memory media as part of said reference information.

* * * * *